US012619071B2

(12) United States Patent
Schmadtke et al.

(10) Patent No.: US 12,619,071 B2
(45) Date of Patent: May 5, 2026

(54) COMPOSITE PANE FOR A HEAD-UP DISPLAY COMPRISING A HEATABLE SENSOR REGION

(71) Applicant: SAINT-GOBAIN GLASS FRANCE, Courbevoie (FR)

(72) Inventors: Lisa Schmadtke, Würselen (DE); Jan Hagen, Bonn (DE); Thomas Gallinelli, Le Creusot (FR); Stephan Gillessen, Alsdorf (DE); Jefferson Do Rosario, Aachen (DE)

(73) Assignee: SAINT-GOBAIN SEKURIT FRANCE, Thourotte (FR)

( * ) Notice: Subject to any disclaimer, the term of this patent is extended or adjusted under 35 U.S.C. 154(b) by 325 days.

(21) Appl. No.: 18/556,579

(22) PCT Filed: Mar. 9, 2022

(86) PCT No.: PCT/EP2022/055998
§ 371 (c)(1),
(2) Date: Oct. 20, 2023

(87) PCT Pub. No.: WO2022/223198
PCT Pub. Date: Oct. 27, 2022

(65) Prior Publication Data
US 2024/0210686 A1 Jun. 27, 2024

(30) Foreign Application Priority Data

Apr. 22, 2021 (EP) ..................................... 21169769

(51) Int. Cl.
*G02B 27/01* (2006.01)
*B32B 17/10* (2006.01)
(Continued)

(52) U.S. Cl.
CPC .... *G02B 27/0101* (2013.01); *B32B 17/10036* (2013.01); *B32B 17/10229* (2013.01);
(Continued)

(58) Field of Classification Search
CPC ................ G02B 27/0101; G02B 1/113; G02B 2027/011; G02B 2027/0194; G02B 7/008;
(Continued)

(56) References Cited

U.S. PATENT DOCUMENTS

2012/0193341 A1* 8/2012 Reul ................. B32B 17/10036
219/203
2014/0319116 A1* 10/2014 Fischer ............... C03C 17/3673
219/203
(Continued)

FOREIGN PATENT DOCUMENTS

DE 10 2014 220189 A1 4/2016
DE 11 2019 002709 T5 3/2021
(Continued)

OTHER PUBLICATIONS

International Search Report as issued in International Patent Application No. PCT/EP2022/055998, dated Jul. 4, 2022.

*Primary Examiner* — Thomas K Pham
*Assistant Examiner* — Kuei-Jen L Edenfield
(74) *Attorney, Agent, or Firm* — CUSHMAN PARTNERS, LLC

(57) ABSTRACT

A composite pane with an HUD region and a sensor region is provided with an electrically conductive coating that reflects the p-polarized radiation of the HUD projector. The electrically conductive coating has precisely one electrically conductive layer based on silver, below which a lower dielectric layer or layer sequence with a refractive index of at least 1.9 is arranged and above which an upper dielectric layer or layer sequence with a refractive index of at least 1.9
(Continued)

Figure 1:
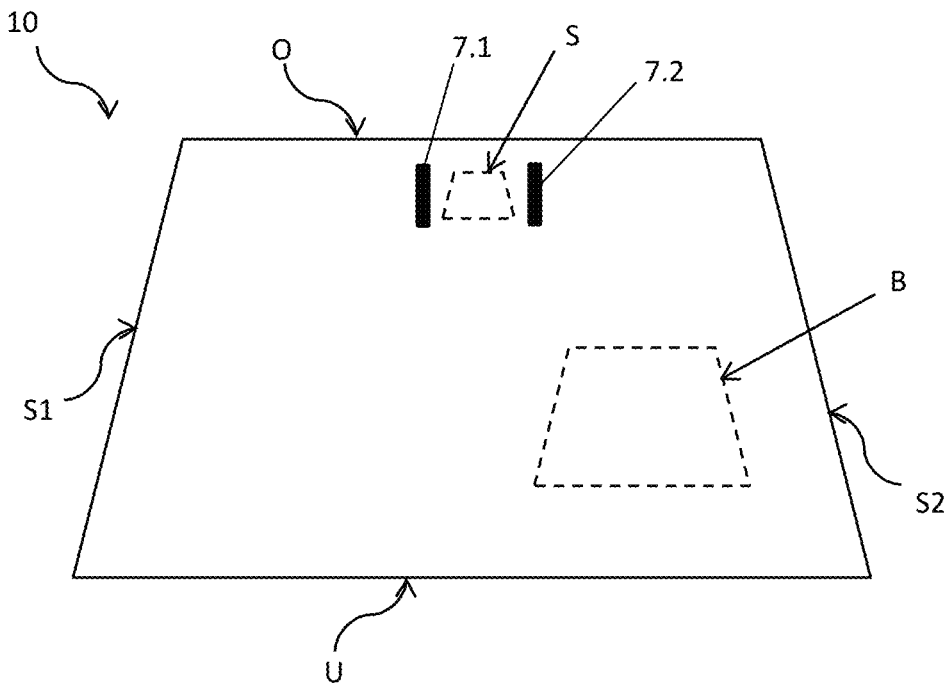

is arranged. The ratio of the optical thickness of the upper dielectric layer or layer sequence to the optical thickness of the lower dielectric layer or layer sequence is at least 1.7. A busbar provided for connection to a voltage source is arranged on both sides of the sensor region and is connected to the coating such that a current path for a heating current is formed between the busbars.

18 Claims, 6 Drawing Sheets

(51) Int. Cl.
  *G02B 1/113*      (2015.01)
  *H05B 3/86*      (2006.01)
(52) U.S. Cl.
  CPC .. *B32B 17/10458* (2013.01); *B32B 17/10761* (2013.01); *H05B 3/86* (2013.01); *B32B 2307/7376* (2023.05); *B32B 2605/00* (2013.01); *G02B 1/113* (2013.01); *G02B 2027/011* (2013.01); *G02B 2027/0194* (2013.01); *H05B 2203/013* (2013.01)
(58) Field of Classification Search
  CPC ........ G02B 27/286; G02B 27/01; G02B 7/00; G02B 27/28; B32B 17/10036; B32B 17/10229; B32B 17/10458; B32B 17/10761; B32B 2307/7376; B32B 2605/00; B32B 17/10; H05B 3/86; H05B 2203/013
  USPC ......................................................... 359/601
  See application file for complete search history.

(56) References Cited

U.S. PATENT DOCUMENTS

| | | | | |
|---|---|---|---|---|
| 2016/0002100 | A1* | 1/2016 | Melcher ............ | B32B 17/10174 |
| | | | | 204/192.27 |
| 2017/0242247 | A1 | 8/2017 | Tso et al. | |
| 2018/0348513 | A1* | 12/2018 | Fischer ............... | C03C 17/3639 |
| 2019/0337270 | A1* | 11/2019 | Sadakane ............... | B32B 23/08 |
| 2021/0084720 | A1* | 3/2021 | Gima ..................... | H05B 3/141 |

FOREIGN PATENT DOCUMENTS

| | | | |
|---|---|---|---|
| EP | 2 510 745 | B1 | 2/2016 |
| WO | WO 2010/136400 | A1 | 12/2010 |
| WO | WO 2012/031907 | A1 | 3/2012 |
| WO | WO 2019/046157 | A1 | 3/2019 |
| WO | WO 2020/083649 | A1 | 4/2020 |
| WO | WO 2021/104800 | A1 | 6/2021 |
| WO | WO 2022/089921 | A1 | 5/2022 |
| WO | WO 2022/136102 | A1 | 6/2022 |
| WO | WO 2022/157022 | A1 | 7/2022 |

* cited by examiner (a)

(b)

(c)

(d)

COMPOSITE PANE FOR A HEAD-UP DISPLAY COMPRISING A HEATABLE SENSOR REGION

CROSS-REFERENCE TO RELATED APPLICATIONS

This application is the U.S. National Stage of PCT/EP2022/055998, filed Mar. 9, 2022, which in turn claims priority to European patent application number 21169769.3 filed Apr. 22, 2021. The content of these applications are incorporated herein by reference in their entireties.

The invention relates to a composite pane for a head-up display (HUD) comprising a heatable sensor region as well as a projection assembly containing this for a head-up display.

Modern automobiles are increasingly equipped with so-called head-up displays (HUDs). With an HUD projector, typically in the region of the dashboard, images are projected onto the windshield, reflected there, and perceived by the driver as a virtual image behind the windshield (from his perspective). Thus, important data can be projected into the driver's field of vision, for example, the current driving speed, navigation or warning messages, which the driver can perceive without having to take his eyes off the road.

HUDs are known in which the HUD projector is operated with p-polarized radiation. Since the typical angle of incidence in vehicles is about 65° and thus close to Brewster's angle for an air/glass transition (56.5° for soda lime glass), no significant reflection occurs at the pane surfaces. This avoids the occurrence of an offset ghost image ("ghost"), which occurs with HUD projectors with s-polarized radiation due to reflection from both external surfaces and is typically remedied with costly wedge-shaped films or glass panes in order to arrange the two surfaces with an angle relative to one another such that the ghost image coincides with the primary image. Instead, the windshield has a reflection coating as a reflection surface for the p-polarized radiation. Such HUDs are disclosed, for example, in DE102014220189A1, WO2019046157A1, and US2017242247A1.

The post-published international application WO2021104800A1 discloses a windshield with a reflection coating for the p-polarized radiation of an HUD projector. The reflection coating has a single silver layer, as a result of which high transparency is ensured. By specific selection of the dielectric layer modules situated above and below this silver layer, good reflection characteristics for p-polarized radiation are achieved, in particular, high average reflectance and color-neutral display.

In addition to HUDs, sensors on windshields are increasingly widespread. Examples include video cameras, night vision cameras, residual light amplifiers, laser rangefinders, passive infrared detectors, radar or lidar sensors, which can also be used in combination, for example, in driver assistance systems (ADAS, Advanced Driver Assistance Systems). The sensor is attached to the windshield on the interior side and associated with a sensor region (typically above the central field of vision) and is suitable for detecting electromagnetic radiation that passes through the sensor region from the outside. For the sensors to function optimally, the sensor region must have certain optical properties. These include relatively high transmittance in the red spectral range (about 600 nm to 700 nm), high transmittance of light that strikes the windshield at a relatively flat angle, and relatively high transmittance of p-polarized radiation compared to s-polarized radiation (to suppress reflections from, for example, a wet road). If the windshield is equipped with an electrically conductive coating, this typically has a negative effect on said optical properties. Consequently, the coating is often removed in the sensor field, as disclosed, for example, in WO2010136400A1, making production of the windshield more complex.

The unpublished international application PCT/EP2021/077996 discloses a windshield with a reflection coating for the p-polarized radiation of an HUD projector. Here, as well, the reflection coating has a single silver layer. The windshield also has a sensor field that is likewise covered with the reflection coating.

It is also desirable for the sensor region to be heatable such that, as needed, it can be freed of ice, frost, dew, or other moisture buildup. For example, heating wires or printed heating conductors can be arranged in an uncoated sensor region, as disclosed, for example, in EP2510745B1 or WO2012031907A1. However, such intrinsically opaque heating conductors reduce light transmittance and can lead to undesirable optical effects, for example, scattering effects, which negatively affect the functionality of the sensor.

The unpublished international application PCT/EP2022/050333 discloses a windshield with a heatable sensor field using a heatable film. The unpublished international application PCT/EP2021/086176 discloses a windshield with an electrically conductive coating based on a transparent conductive oxide (TCO) that is used to heat a sensor field.

There continues to be a need for composite panes that can be used as a projection surface for an HUD with p-polarized radiation and therefore have a reflection coating and that are equipped with a sensor field without having to remove the reflection coating in the sensor field. The simplest possible heating of the sensor field should be possible and the composite pane should be usable as a vehicle pane, in particular as a windshield. The object of the present invention is to provide such an improved composite pane.

The object of the present invention is accomplished according to the invention by a composite pane for a head-up display (HUD) with a heatable sensor region in accordance with claim 1. Preferred embodiments are apparent from the dependent claims.

According to the invention, p-polarized radiation is used to generate the HUD image, and the composite pane has an electrically conductive coating (reflection coating) that sufficiently reflects p-polarized radiation. Since the angle of incidence of about 65° typical for HUD projection assemblies is relatively close to Brewster's angle for an air/glass transition (56.5°, soda lime glass), p-polarized radiation is hardly reflected by the pane surfaces, but instead primarily by the conductive coating. Consequently, ghost images do not occur or are hardly perceptible such that the use of an expensive wedge film can be dispensed with. In addition, the HUD image is recognizable even for wearers of polarization-selective sunglasses, which typically allow only p-polarized radiation to pass through and block s-polarized radiation. The reflection coating according to the invention provides high reflectivity for p-polarized radiation in the spectral range from 450 nm to 650 nm, which is relevant for HUD displays (HUD projectors typically operate with the wavelengths 473 nm, 550 nm, and 630 nm (RGB)). A high-intensity HUD image is thus achieved. The single silver layer does not excessively reduce light transmittance such that the pane can still be used as a windshield. The ratio according to the invention of the optical thicknesses of the upper and lower dielectric layer sequence causes a smoothing of the reflection spectrum such that a color-neutral display is ensured. The advantageous reflection properties, in particular the uniformity of the spectrum, extend even beyond the HUD-relevant spectral range to a spectral range from 400 nm to 680 nm such that, in addition to a good HUD display, a positive overall impression of the pane is achieved without a disturbing color cast.

Moreover, it has surprisingly been demonstrated that the reflection coating is compatible with common sensors; it therefore does not have to be removed in the region of the sensor region. The reflection coating has, in particular, relatively high transmittance in the red spectral range, high transmittance of light that strikes the composite pane at a relatively flat angle, and relatively high transmittance of p-polarized radiation compared to s-polarized radiation such that reflections that interfere with the sensors are suppressed. It has further been shown that the reflection coating has suitable sheet resistance to heat the sensor region by electrically contacting it with busbars on both sides of the sensor region such that a heating current is conducted through the sensor region. These are major advantages of the present invention.

The composite pane according to the invention is intended as a reflection surface for an HUD and has a heatable sensor region. The composite pane is preferably a vehicle pane, in particular a window pane of a motor vehicle, preferably a passenger car or truck. The composite pane is particularly preferably a windshield. However, in principle, the composite pane can also be a side window or rear window of a vehicle.

The composite pane according to the invention comprises an outer pane and an inner pane that are joined to one another via a thermoplastic intermediate layer. The composite pane is intended, in a window opening (in particular, of a vehicle) to separate the interior from the external surroundings. In the context of the invention, the term "inner pane" refers to the pane of the composite pane facing the vehicle interior. The term "outer pane" refers to the pane facing the external surroundings.

The composite pane has an upper edge (upper edge face) and a lower edge (lower edge face) as well as two side edges extending therebetween (side edge faces). "Upper edge" refers to that edge (edge face) that is intended to point upward in the installed position. "Lower edge" refers to that edge (edge face) that is intended to point downward in the installed position. The upper edge is also often referred to as the "roof edge"; and the lower edge, as the "engine edge".

The outer pane and the inner pane have in each case an exterior-side surface and an interior-side surface and a peripheral side edge extending therebetween (edge face). In the context of the invention, "exterior-side surface" refers to that primary surface that is intended, in the installed position, to face the external surroundings. In the context of the invention, "interior-side surface" refers to that primary surface that is intended, in the installed position, to face the interior. The interior-side surface of the outer pane and the exterior-side surface of the inner pane face each other and are joined to one another via or by the thermoplastic intermediate layer.

The composite pane according to the invention has an HUD region and a sensor region. The HUD region is intended for irradiation by an HUD projector with predominantly p-polarized radiation. The sensor region is intended for transmission of electromagnetic radiation for a sensor arranged on the interior side, which is directed toward the interior-side surface of the inner pane such that it can detect the radiation passing through the sensor region "from outside" (i.e., via the outer pane toward the inner pane). The HUD region and the sensor region are spatially separated from one another, i.e., do not overlap. In an advantageous embodiment, the sensor region is arranged outside a central through-vision region of the composite pane, in particular between the central through-vision region and the upper edge, while the HUD region is arranged (at least partially) inside the central through-vision region. If the composite pane according to the invention is a vehicle windshield, said through-vision region is, in particular, a field of vision defined in ECE-R43 (Regulation No. 43 of the United Nations Economic Commission for Europe (UN/ECE); "Uniform provisions concerning the approval of safety glazing materials and their installation in vehicles"), preferably:

the field of vision B, if the vehicle pane is intended for a Category M1 vehicle (vehicle for passenger transport with no more than eight seats in addition to the driver's seat, for example, passenger cars); the field of vision B is defined in Annex 18 of ECE-R43;

the field of vision I, if the vehicle pane is intended for a Category M vehicle, other than M1, (other vehicles for passenger transport) or for a Category N vehicle (vehicles for transport of goods).

The composite pane according to the invention is provided with an electrically conductive coating. The electrically conductive coating can also be referred to as a reflection coating, since its primary function is the reflection of the radiation of the HUD projector to generate the HUD display image. Accordingly, according to the invention, it is suitable for reflecting the radiation of the HUD projector. The electrically conductive coating is preferably applied to one of the surfaces of the two panes facing the intermediate layer, i.e., the interior-side surface of the outer pane or the exterior-side surface of the inner pane. Alternatively, the electrically conductive coating can also be arranged within the thermoplastic intermediate layer, for example, applied to a carrier film that is arranged between two thermoplastic bonding films. Particularly preferred is the arrangement of the electrically conductive coating on the exterior-side surface of the inner pane, because the projector radiation then has to travel the shortest possible path through the composite pane until it strikes the reflection coating. This is advantageous in terms of the quality of the HUD image. The electrically conductive coating is transparent, which, in the context of the invention, means that it has average transmittance in the visible spectral range of at least 70%, preferably at least 80%, and thus does not substantially restrict through-vision through the pane.

Both the HUD region and the sensor region of the composite pane are completely covered with the electrically conductive coating. In the HUD region, the coating serves to reflect the radiation of the HUD projector; in the sensor region, to heat it. Only the sensor region is heated, while the HUD region is not heated by the coating, i.e., no heating current flows through the HUD region. In a particularly preferred embodiment of the invention, at least 80% of the composite pane surface is provided with the coating according to the invention. In particular, the coating is applied over the entire surface with the exception of a circumferential edge region and, optionally, a local region which, as a communication window (data transmission window) is intended to ensure the transmission of electromagnetic high-frequency radiation. The circumferential uncoated edge region has, for example, a width of up to 20 cm. It prevents direct contact of the coating with the surrounding atmosphere such that it is protected, in the interior of the composite pane, against corrosion and damage. Such a large-area use of the coating is, on the one hand, preferred for manufacturing reasons because the large-area coating is easier to implement than the coating of two locally limited regions; and, on the other, increases the thermal comfort in the interior due to the reflective effect for the infrared components of solar radiation.

In an advantageous embodiment, the light transmittance of the composite pane, measured at an angle of incidence of 0° relative to the surface normal, is at least 70%. Then, the composite pane can be used as a vehicle windshield. The light transmittance is measured with a radiation source of illuminant type A and describes the proportion of the light passing through the composite pane "from outside" (i.e., when the exterior-side surface of the outer pane is irradiated in the direction of the inner pane), with the light directed at it at an angle of incidence of 0° relative to the exterior-side surface normal of the exterior-side of the outer pane. The light transmittance refers, in particular, to the entire visible spectral range from 380 nm to 780 nm. Said light transmittance occurs, in particular, in a central through-vision region, while, for example, a circumferential edge region can be opaquely equipped with a masking print, as is common for windshields and rear windows of vehicles. The light transmittance is often also referred to as total transmittance and is based in particular on the process for testing the light permeability of motor vehicle windows specified by ECE-R 43, Annex 3, § 9.1.

In an advantageous embodiment, the light transmittance of the composite pane, measured at an angle of incidence of 73.5° relative to the surface normal, is at least 50%, preferably at least 55%. The light transmittance is measured with a radiation source of illuminant type A and describes the proportion of the light passing through the composite pane "from outside" (i.e., when the exterior-side surface of the outer pane is irradiated in the direction of the inner pane), with the light directed at it at an angle of incidence of 73.5° relative to the exterior-side surface normal of the exterior-side surface of the outer pane. The light transmittance refers, in particular, to the entire visible spectral range from 380 nm to 780 nm. Said light transmittance occurs, in particular, in the sensor region and is preferably measured in the geometric center of the sensor region. Radiation passing horizontally through the composite pane or the sensor region has an angle of incidence that essentially corresponds to the installation angle of the composite pane (typically in the vehicle) relative to the vertical. Typical installation angles of windshields in vehicles are from 55° to 75°, in particular from 60° to 70°. The angle of incidence of 73.5° is therefore used for characterization because it occurs with composite panes that are installed comparatively flat. The composite pane according to the invention thus has good transmittance values for the sensor even when it is installed comparatively flat. This ensures good detection efficiency of the sensor and meets the typical specifications of vehicle manufacturers.

In an advantageous embodiment, the ratio of the transmittance in the spectral range from 600 nm to 700 nm to transmittance in the spectral range from 440 nm to 700 nm of the composite pane is greater than 0.85, particularly preferably greater than 0.9. The values mentioned are integral values, i.e., averaged values for the corresponding wavelength ranges that are not offset against the eye-sensitivity curve and an illuminant type. Said ratio is referred to in the following as "transmittance ratio". The transmittance ratio is measured with light passing through the composite pane "from outside" (i.e., when the exterior-side surface of the outer pane is irradiated in the direction of the inner pane), with the light directed at it at an angle of incidence of 0° relative to the exterior-side surface normal of the exterior-side surface of the outer pane. Said transmittance ratio occurs in particular in the sensor region and is preferably measured in the geometric center of the sensor region. A high transmittance ratio is required by vehicle manufacturers in particular when the sensor is a camera. The high transmittance ratio ensures good functionality of the sensor.

In an advantageous embodiment, the ratio of the transmittance of p-polarized light to transmittance of s-polarized light is at least 1.20, preferably at least at least 1.50, most preferably at least 1.60, and in particular 1.70. In the context of the invention, this ratio is referred to as the polarization ratio. The polarization ratio is measured with a radiation source of illuminant type A with light passing through the composite pane "from outside" (i.e., when the exterior-side surface of the outer pane is irradiated in the direction of the inner pane), with the light directed at it at an angle of incidence of 70° relative to the exterior-side surface normal of the exterior-side surface of the outer pane. The polarization ratio refers in particular to the entire visible spectral range from 380 nm to 780 nm. Said polarization ratio occurs in particular in the sensor region and is preferably measured in the geometric center of the sensor region. A high polarization ratio can reduce an interfering influence on the sensor, caused, for example, by light reflected from a moist road, since such reflections are mainly s-polarized. This ensures good functionality of the sensor and meets typical specifications of vehicle manufacturers.

In an advantageous embodiment, the sheet resistance of the electrically conductive coating is from 2 Ω/square to 10 Ω/square, preferably from 3 Ω/square to 5 Ω/square. This allows good heating performance to be achieved in the sensor region, in particular in conjunction with typical on-board voltages of vehicles such that the sensor region can be freed of ice or condensed moisture in a reasonable time in order to ensure the functionality of the sensor.

The composite pane provided with the reflection coating preferably has, in the spectral range from 400 nm to 680 nm, an averaged reflectance for p-polarized radiation of at least 10%, particularly preferably of at least 15%, most particularly preferably of at least 20%. This produces a sufficiently high-intensity projection image. Here, reflectance is measured with an angle of incidence of 65° relative to the interior-side surface normal, which corresponds approx. to the radiation by conventional projectors. The spectral range from 400 nm to 680 nm was used to characterize the reflection characteristics because the visual impression of a viewer is primarily influenced by this spectral range. In addition, it covers the wavelengths relevant for the HUD display (RGB: 473 nm, 550 nm, 630 nm). The high reflectance, along with a relatively simple layer structure, is a major advantage of the present invention. Particularly good results are achieved when the reflectance in the entire spectral range from 400 nm to 680 nm is at least 10%, preferably at least 15%, most preferably at least 20% such that the reflectance in the specified spectral range is not below the specified values at any point.

Reflectance describes the proportion of the total incident radiation that is reflected. It is indicated in % (based on 100% incident radiation) or as a unitless number from 0 to 1 (normalized to the incident radiation). Plotted as a function of the wavelength, it forms the reflection spectrum. In the context of the present invention, the statements concerning reflectance relative to p-polarized radiation are based on the reflectance measured with an angle of incidence of 65° relative to the interior-side surface normal. The data regarding the reflectance or the reflection spectrum are based on a reflection measurement with a light source that emits uniformly with a normalized radiation intensity of 100% in the spectral range under consideration.

In order to achieve the most color-neutral display of the projector image possible, the reflection spectrum should be as smooth as possible and should have no pronounced local minima and maxima. In the spectral range from 400 nm to 680 nm, the difference between the maximally occurring reflectance and the mean of the reflectance as well as the difference between the minimally occurring reflectance and the mean of the reflectance in a preferred embodiment should be at most 3%, particularly preferably at most 2%. Here again, the reflectance for p-polarized radiation is measured with an angle of incidence of 65° relative to the interior-side surface normal. The resultant difference is to be considered as the absolute deviation of reflectance (reported in %), not as a percentage deviation relative to the mean. The reported smoothness of the reflection spectrum can easily be achieved with the reflection coating according to the invention due to its electrically conductive layer.

Alternatively, the standard deviation in the spectral range from 400 nm to 680 nm can be used as a measure of the smoothness of the reflection spectrum. It is preferably less than 1%, particularly preferably less than 0.9%, most particularly preferably less than 0.8%.

The above-mentioned characteristics regarding light transmittance at various angles of incidence, the transmittance ratio, the polarization ratio, the sheet resistance, and the reflection behavior for p-polarized radiation can be easily realized with the electrically conductive coating, which is one of its major advantages.

The sensor region is a transparent region of the composite pane that is suitable and intended for transmitting electromagnetic radiation passing through the composite pane from the outside that can be detected by a sensor arranged or to be arranged on the interior side. For this, the sensor is preferably attached or to be attached on the interior-side surface of the inner pane. Typically, the sensor is arranged in a plastic housing that is glued or to be glued to the interior-side surface of the inner pane.

The sensors used here are, in particular, infrared (IR) sensors, sensors for light in the visible spectral range, ultraviolet (UV) sensors, cameras, radar or lidar systems. Even multiple different sensors can be associated with the sensor region. The sensor or sensors can be provided for driver assistance systems (ADAS, Advanced Driver Assistance Systems) or even for autonomous driving.

According to the invention, busbars are arranged on both sides of the sensor region to heat the sensor region. At least one busbar is arranged on each side of the sensor region such that the sensor region is situated between between the busbars. The busbars are connected to the electrically conductive coating such that a current path for a heating current is formed between them. The current path runs across the sensor region, is thus arranged (partially) within the sensor region. The busbars are provided for connection to an external voltage source, whereby they are connected to the opposite poles of the voltage source such that an electrical voltage is applied to the busbars; and, as result, the heating current flows along the current path through the coating and heats the same in the sensor region. The busbars are preferably arranged laterally to the sensor region—the at least one first busbar is thus arranged between the sensor region and one side edge of the composite pane, and the at least one second busbar is arranged between the sensor region and the other side edge of the composite pane. The busbars then extend substantially vertically, i.e., in the direction between the upper edge and the lower edge of the composite pane, and the heating current flows substantially horizontally, i.e., in the direction between the side edges of the composite pane. This is particularly advantageous for the electrical contacting of the busbars, which can then be done in the vicinity of the upper edge (or the lower edge).

For the electrical connection of the busbars to the voltage source, the busbars are preferably connected to flat conductors (foil conductors), which, starting from the respective busbar extend beyond the nearest edge (in particular the upper edge) of the composite pane. These flat conductors can then be connected to electrical cables to make the connection to the voltage source. The foil conductors include an electrically conductive core in the form of a metallic foil (for example, copper foil) and typically have an insulating sheath. The foil conductors can preferably be soldered onto the busbars. The voltage source is in particular the on-board voltage of the vehicle, when the composite pane is a vehicle pane. Common on-board voltages are 12 V to 14 V, with even higher voltages recently also used, for example, from 12 V to 50 V. It has been shown that the coating according to the invention achieves a sufficient heating effect with such voltages to heat the sensor region. However, due to the only one silver layer, the heating effect is generally insufficient to reasonably heat the entire composite pane. Consequently, the current path is preferably selectively associated with the sensor region, while the majority of the composite pane is not heated by the electrically conductive coating. In particular, the central through-vision region is preferably not heated by the electrically conductive coating, in the case of a vehicle windshield, in particular the field of vision vision B or I per ECE-R43.

The sensor region typically has an area of 10 cm$^2$ to 50 cm$^2$. The heatable region of the composite pane or the coating (heating region) situated between the busbars typically also includes adjacent regions, in addition to the actual sensor region. The heating region preferably has an area of 20 cm$^2$ to 100 cm$^2$.

The two busbars are implemented in the form of strips and preferably have a distance from one another of 5 cm to 100 cm, particularly preferably of 10 cm to 90 cm. The distance can be constant if the busbars are arranged parallel to one another—the heating region is then essentially rectangular. The distance can also be variable if the busbars are arranged at a finite angle relative to one another—the heating region is then essentially trapezoidal. Even more complex shapes of the heating region are possible. The busbars can be linear overall or can comprise multiple linear regions arranged at a finite angle relative to one another, or can even be curved.

The width of the busbars (dimension lengthwise relative to the current path) is preferably from 2 mm to 30 mm, particularly preferably from 4 mm to 20 mm, and in particular from 10 mm to 20 mm. This yields good results in terms of the electrical resistance of the busbars. The length of the busbars (dimension perpendicular to the current path) is governed by the size of the sensor region or heating region and is, for example, from 5 cm to 40 cm, in particular from 10 cm to 30 cm.

The inherently transparent sensor region is typically surrounded by an opaque region. The busbars are preferably arranged in this opaque region to hide them, as it were. The opaque region can be realized by a masking print that is formed by a printed and baked enamel, in particular on the interior-side surface of the outer pane and/or of the inner pane. Alternatively, the intermediate layer can be opaque, for example, through the use of opaque foil sections, or an opaque element can be inserted into the intermediate layer.

The busbars can be printed onto the substrate surface provided with the coating (in particular the interior-side surface of the outer pane provided with the coating or the exterior-side surface of the inner pane), either above or below the coating. For this, electrically conductive printing pastes are used, in particular containing silver particles and glass frits, which are typically printed by screen printing and baked. The layer thickness of the busbars is preferably from 5 μm to 40 μm, particularly preferably from 8 μm to 20 μm, most particularly preferably from 8 μm to 12 μm. Printed busbars with these thicknesses are technically easy to implement and have advantageous current-carrying capacity. The specific resistance of the busbars is preferably from 0.8 μOhm·cm to 7.0 Ohm·cm and particularly preferably from 1.0 μOhm·cm to 2.5 Ohm·cm.

Alternatively, the busbars can be implemented as strips of an electrically conductive foil, in particular metal foil, for example, copper foil, which can optionally be tinned. The busbars are placed on the coating and optionally soldered or glued thereto. The thickness of the foil is preferably from 10 μm to 500 μm, particularly preferably from 30 μm to 300 μm. This solution is particularly advantageous when the coating is arranged on a carrier film within the intermediate layer.

The busbars can simply be connected to the region of the electrically conductive coating containing the sensor region, as a result of which the heating region is formed between them, with the coating in the heating region not being separated from the surrounding coating. In another embodiment of the invention, the heating region, together with the busbars, is electrically insulated and/or materially separated from the surrounding coating by a line-like uncoated region (insulation line). The insulation line is preferably introduced into the coating by means of laser-assisted decoating methods. The insulation line can form a closed shape, for example, a rectangle or a trapezoid, and completely surround the heating region. The busbars are preferably arranged completely within the region delimited by the insulation line. Alternatively, the beginning and the end of the insulation line can extend all the way to the edge of the coating, as result of which a heating region adjacent said edge is separated. The separated region preferably includes the busbars and the sensor region in their entirety. This has the advantage that the busbars can extend all the way to the edge of the coating (or even to the edge of the composite pane), where they can be electrically contacted in a particularly advantageous manner. The insulation line typically has two end sections adjacent the edge of the coating that run substantially parallel to the busbars and a middle section extending between them. A region situated between the busbars and between the sensor region and the edge of the coating can be separated from the heating region by a further insulation line. This second insulation line preferably has two end sections adjacent the edge of the coating, which run substantially parallel to the busbars and a middle section extending between them.

It is also possible for at least one insulation line that runs from one busbar to the opposite busbar, in particular substantially parallel to the current path, to be arranged within the heating region. Thus, the heating current can be selectively guided, which can be advantageous in particular if the busbars are not arranged parallel to one another.

The electrically conductive coating (reflection coating) according to the invention has precisely one electrically conductive layer based on silver. A lower dielectric layer or layer sequence is arranged below the electrically conductive layer. Likewise, an upper dielectric layer or layer sequence is arranged above the electrically conductive layer. The upper and the lower dielectric layer or layer sequence have in each case a refractive index that is at least 1.9.

In the context of the present invention, refractive indices are, in principle, indicated in relation to a wavelength of 550 nm. The optical thickness is the product of the geometric thickness and the refractive index (at 550 nm). The optical thickness of a layer sequence is calculated as the sum of the optical thicknesses of the individual layers.

In the context of the invention, if a first layer is arranged "above" a second layer, this means that the first layer is arranged farther from the substrate on which the coating is applied than the second layer. In the context of the invention, if a first layer is arranged "below" a second layer, this means that the second layer is arranged farther from the substrate than the first layer. The lower dielectric layer (sequence) is accordingly arranged between the electrically conductive layer and the substrate surface. The upper dielectric layer (sequence) is arranged on the side of the electrically conductive layer facing away from the substrate surface such that the electrically conductive layer and the lower dielectric layer (sequence) situated below it is arranged between the substrate surface and the upper dielectric layer (sequence). The substrate surface is the interior-side surface of the outer pane, the exterior-side surface of the inner pane, or the surface of a film of the intermediate layer.

When a layer is based on a material, the layer consists for the most part of this material, in particular substantially of this material in addition to any impurities or dopants.

According to the invention, the ratio of the optical thickness of the upper dielectric layer or layer sequence to the optical thickness of the lower dielectric layer or layer sequence is at least 1.7. It has surprisingly been shown that this asymmetry of the optical thicknesses results in a significantly smoother reflection spectrum for p-polarized radiation such that there is relatively constant reflectance over the entire relevant spectral range (400 nm to 680 nm). As a result, a color-neutral display of the HUD projection is ensured and a color-neutral overall impression of the pane. In addition, the ratio of the optical thicknesses is advantageous in terms of a high transmittance ratio, a high polarization ratio, and high light transmittance at high angles of incidence, in particular at an angle of incidence of 73.5°.

The ratio of the optical thicknesses according to the invention is calculated as the quotient of the optical thickness of the upper dielectric layer or layer sequence (dividend) divided by the optical thickness of the lower dielectric layer or layer sequence (divisor). If there is more than one dielectric layer below and/or above the electrically conductive layer, there is an upper or lower dielectric layer sequence that includes all dielectric layers above or below the electrically conductive layer. Thus, when calculating the optical thickness of the upper and lower dielectric layer sequence, all dielectric layers must be included.

In a preferred embodiment, the ratio of the optical thickness of the upper dielectric layer or layer sequence to the optical thickness of the lower dielectric layer or layer sequence is at least 1.8, particularly preferably at least 1.9. Particularly good results are achieved with this.

The reflection coating is a thin-layer stack, i.e., a layer sequence of thin individual layers. This thin-layer stack contains exactly one electrically conductive layer based on silver. The electrically conductive layer based on silver gives the reflection coating the basic reflecting properties and also an IR-reflecting effect and electrical conductivity. The reflection coating contains exactly one silver layer, i.e., not more than one silver layer; and also no further silver layers are arranged above or below the reflection coating. It is a particular advantage of the present invention that the desired reflection properties can be achieved with one silver layer without excessively reducing the transmittance, as would be the case if multiple conductive layers were used. However, it is also possible for other metallic layers to be present that do not substantially contribute to the electrical conductivity of the reflection coating but serve a different purpose. This applies in particular to metallic blocking layers with geometric thicknesses less than 1 nm, which are preferably arranged between the silver layer and the dielectric layer sequences.

The electrically conductive layer is based on silver. The conductive layer preferably contains at least 90 wt-% silver, particularly preferably at least 99 wt-% silver, most particularly preferably at least 99.9 wt-% silver. The silver layer can have dopants, for example, palladium, gold, copper, or aluminum. The geometric layer thickness of the silver layer is preferably at most 15 nm, particularly preferably at most 14 nm, most particularly preferably at most 12 nm. As a result, advantageous reflectivity can be achieved in the IR range without excessively reducing transmittance. The geometric layer thickness of the silver layer is preferably at least 5 nm, particularly preferably at least 8 nm. Thinner silver layers can lead to dewetting of the layer structure. Particularly preferably, the geometric layer thickness of the silver layer is from 8 nm to 14 nm. It has been shown that thinner silver layers are advantageous for the functionality of the sensor, in particular because higher transmittance is achieved at higher angles of incidence (in particular 73.5°). The geometric layer thickness of the silver layer is therefore most particularly preferably from 10 nm to 12 nm or even only from 10 nm to 11 nm.

In an advantageous embodiment, the reflection coating includes no dielectric layers whose refractive index is less than 1.9. In other words, all dielectric layers of the reflection coating have a refractive index of at least 1.9. It is a particular advantage of the present invention that the desired reflection properties can be achieved with relatively high-refractive-index dielectric layers alone. Since silicon oxide layers that have low deposition rates in magnetron enhanced cathodic deposition are, in particular, considered for low-refractive-index layers with a refractive index of less than 1.9, the reflection coating according to the invention can thus be produced quickly and economically.

The reflection coating contains, above and below the silver layer, independently of one another in each case, a dielectric layer or a dielectric layer sequence with a refractive index of at least 1.9. The dielectric layers can, for example, be based on silicon nitride, zinc oxide, tin zinc oxide, mixed silicon-metal nitrides, such as silicon-zirconium nitride, zirconium oxide, niobium oxide, hafnium oxide, tantalum oxide, tungsten oxide, or silicon carbide. The oxides and nitrides mentioned can be deposited stoichiometrically, substoichiometrically, or superstoichiometrically. They can have dopants, for example, aluminum, zirconium, titanium, or boron. The dopants can provide inherently dielectric materials with a certain electrical conductivity. The person skilled in the art will nevertheless identify them as dielectric layers in terms of their function, as is usual in the field of thin layers. The material of the dielectric layers preferably has electrical conductivity (reciprocal of specific resistance) of less than $10^{-4}$ S/m. The material of the electrically conductive layer preferably has electrical conductivity greater than $10^4$ S/m.

The optical thickness of the upper dielectric layer or layer sequence is preferably from 100 nm to 200 nm, particularly preferably from 130 nm to 170 nm. The optical thickness of the lower dielectric layer or layer sequence is preferably from 50 nm to 100 nm, particularly preferably from 60 nm to 90 nm. Particularly good results are achieved with this.

In an advantageous embodiment, a dielectric layer, which can be referred to as an anti-reflection layer and is preferably based on an oxide, for example, tin oxide, and/or a nitride, for example, silicon nitride, particularly preferably based on silicon nitride is, in each case, arranged above and below the silver layer. Silicon nitride has proved to be a good choice due to its optical properties, its easy availability, and its high mechanical and chemical stability. The silicon is preferably doped, for example, with aluminum or boron. In the case of dielectric layer sequences, the silicon nitride based layer is preferably the top layer of the upper layer sequence or the bottom layer of the lower layer sequence. The geometric thickness of the upper anti-reflection layer is preferably from 50 nm to 100 nm, particularly preferably from 55 nm to 80 nm, in particular from 60 nm to 70 nm. The geometric thickness of the lower anti-reflection layer is preferably from 10 nm to 50 nm, particularly preferably from 15 nm to 40 nm, in particular from 20 nm to 35 nm.

In addition to the anti-reflection layer, further dielectric layers with a refractive index of at least 1.9 can optionally be present. Thus, the upper and lower layer sequence can, independently of one another, contain a matching layer to improve the reflectivity of the silver layer. The matching layers are preferably based on zinc oxide, particularly preferably zinc oxide $ZnO_{1-\delta}$ with $0 \leq \delta \leq 0.01$. The matching layers preferably further contain dopants. The matching layers can, for example, contain aluminum-doped zinc oxide (ZnO:Al). The zinc oxide is preferably deposited substoichiometrically in terms of oxygen in order to avoid reaction of excess oxygen with the silver-containing layer. The matching layers are preferably arranged between the silver layer and the anti-reflection layer. The geometric thickness of the matching layer is preferably from 5 nm to 30 nm, particularly preferably from 8 nm to 12 nm.

Refractive-index-enhancing layers that have a higher refractive index than the anti-reflection layer can also be present, likewise independently of one another, in the upper and lower layer sequence. This can further improve and fine-tune the optical properties, in particular the reflection properties. The refractive-index-enhancing layers preferably contain a mixed silicon-metal nitride, such as mixed silicon-zirconium nitride, mixed silicon-aluminum nitride, mixed silicon-titanium nitride, or mixed silicon-hafnium nitride, particularly preferably mixed silicon-zirconium nitride. The proportion of zirconium is preferably between 15 and 45 wt-%, particularly preferably between 15 and 30 wt-%. Alternative materials can be, for example, $WO_3$, $Nb_2O_5$, $Bi_2O_3$, $TiO_2$, $Zr_3N_4$a, and/or AlN The refractive-index-enhancing layers are preferably arranged between the anti-reflection layer and the silver layer or between the matching layer (if present) and the anti-reflection layer. The geometric thickness of the refractive-index-enhancing layers is preferably from 5 nm to 30 nm, particularly preferably from 5 nm to 15 nm.

In one embodiment of the invention, precisely one lower dielectric layer (anti-reflection layer) with a refractive index of at least 1.9, preferably based on silicon nitride, is arranged below the electrically conductive layer. Likewise, precisely one upper dielectric layer (anti-reflection layer) with a refractive index of at least 1.9, preferably based on silicon nitride, is arranged above the electrically conductive layer. This results in the layer sequence, starting from the substrate: lower anti-reflection layer-silver layer-upper anti-reflection layer. The reflection coating preferably does not contain any other dielectric layers. The geometric thickness of the upper anti-reflection layer is preferably from 50 nm to 100 nm, particularly preferably from 55 nm to 80 nm, in particular from 60 nm to 70 nm. The geometric thickness of the lower anti-reflection layer is preferably from 10 nm to 50 nm, particularly preferably from 15 nm to 40 nm, in particular from 20 nm to 35 nm.

In another embodiment of the invention, a first lower dielectric layer (anti-reflection layer) and a second lower dielectric layer (matching layer) are arranged in the reflection coating below the electrically conductive layer. Likewise, a first upper dielectric layer (anti-reflection layer) and a second upper dielectric layer (matching layer) are arranged above the electrically conductive layer. The anti-reflection and matching layers have a refractive index of at least 1.9. The anti-reflection layers are preferably based on silicon nitride; the matching layers, on zinc oxide. The matching layers are preferably arranged between the respective anti-reflection layer and the silver layer: This results in the layer sequence, starting from the substrate: lower anti-reflection layer-lower matching layer-silver layer-upper matching layer-upper anti-reflection layer. The reflection coating preferably does not contain any other dielectric layers. The geometric thickness of the upper anti-reflection layer is preferably from 50 nm to 100 nm, particularly preferably from 55 nm to 80 nm, in particular from 60 nm to 70 nm. The geometric thickness of the lower anti-reflection layer is preferably from 10 nm to 50 nm, particularly preferably from 15 nm to 40 nm, in particular from 20 nm to 35 nm. The geometric thickness of the matching layers is preferably from 5 nm to 30 nm, particularly preferably from 8 nm to 12 nm.

In another embodiment of the invention, a first lower dielectric layer (anti-reflection layer), a second lower dielectric layer (matching layer), and a third lower dielectric layer (refractive-index-enhancing layer) are arranged below the electrically conductive layer. Likewise, a first upper dielectric layer (anti-reflection layer), a second upper dielectric layer (matching layer), and a third upper dielectric layer (refractive-index-enhancing layer) are arranged above the electrically conductive layer. The anti-reflection and matching layers and the refractive-index-enhancing layers have a refractive index of at least 1.9. The refractive-index-enhancing layers have a higher refractive index than the anti-reflection layers, preferably at least 2.1. The anti-reflection layers are preferably based on silicon nitride; the matching layers, based on zinc oxide; the refractive-index-enhancing layers, based on a mixed silicon-metal nitride, such as mixed silicon-zirconium nitride or mixed silicon-hafnium nitride. The matching layers preferably have the least distance from the silver layer, while the refractive-index-enhancing layers are arranged between the matching layers and the anti-reflection layers. This results in the layer sequence, starting from the substrate: lower anti-reflection layer-lower refractive-index-enhancing layer-lower matching layer-silver layer-upper matching layer-upper refractive-index-enhancing layer-upper anti-reflection layer. The reflection coating preferably does not contain any other dielectric layers. The geometric thickness of the upper anti-reflection layer is preferably from 50 nm to 100 nm, particularly preferably from 55 nm to 80 nm, in particular from 60 nm to 70 nm. The geometric thickness of the lower anti-reflection layer is preferably from 10 nm to 50 nm, particularly preferably from 15 nm to 40 nm, in particular from 20 nm to 35 nm. The geometric thickness of the matching layers is preferably from 5 nm to 30 nm, particularly preferably from 8 nm to 12 nm. The geometric thickness of the refractive-index-enhancing layers is preferably from 5 nm to 30 nm, particularly preferably from 5 nm to 15 nm.

Since the upper and the lower dielectric layer sequence can be formed independently of one another, combinations of the above described embodiments are also possible, wherein the upper dielectric layer/layer sequence is formed according to one embodiment and the lower dielectric layer/layer sequence is formed according to a different one. The following preferred layer sequences result (in each case starting from the substrate, i.e., the surface on which the reflection coating is deposited:

lower anti-reflection layer-silver layer-upper anti-reflection layer
  lower anti-reflection layer-silver layer-upper matching layer-upper anti-reflection layer
  lower anti-reflection layer-silver layer-upper matching layer-upper refractive-index-enhancing layer-upper anti-reflection layer
  lower anti-reflection layer-lower matching layer-silver layer-upper anti-reflection layer
  lower anti-reflection layer-lower matching layer-silver layer-upper matching layer-upper anti-reflection layer
  lower anti-reflection layer-lower matching layer-silver layer-upper matching layer-upper refractive-index-enhancing layer-upper anti-reflection layer
  lower anti-reflection layer-lower refractive-index-enhancing layer-lower matching layer-silver layer-upper anti-reflection layer
  lower anti-reflection layer-lower refractive-index-enhancing layer-lower matching layer-silver layer-upper matching layer-upper anti-reflection layer
  lower anti-reflection layer-lower refractive-index-enhancing layer-lower matching layer-silver layer-upper matching layer-upper refractive-index-enhancing layer-upper anti-reflection layer In an advantageous embodiment, the reflection coating includes at least one metallic blocking layer. The blocking layer can be arranged below and/or above the silver layer and preferably makes direct contact with the silver layer. The blocking layer is then positioned between the silver layer and the dielectric layer/layer sequence. The blocking layer serves as oxidation protection for the silver layer in particular during temperature treatments of the coated pane, as typically occur during bending processes. The blocking layer preferably has a geometric thickness less than 1 nm, for example, 0.1 nm to 0.5 nm. The blocking layer is preferably based on titanium or a nickel-chromium alloy. The blocking layer is particularly effective directly above the silver layer, as a result of which, in a preferred embodiment, the reflection coating has a blocking layer above the silver layer and no blocking layer below the silver layer. The silver layer then makes direct contact with the lower dielectric layer (sequence) and indirect contact with the upper dielectric layer (sequence) via the blocking layer.

The blocking layer changes the optical properties of the reflection coating only insignificantly and is preferably present in all the embodiments described above. Particularly preferably, the blocking layer is arranged directly above the silver layer, i.e., between the silver layer and the upper dielectric layer (sequence), where it is particularly effective. Optionally, in each case, an additional blocking layer can be arranged directly below the silver layer, i.e., between the silver layer and the lower dielectric layer (sequence).

Since the reflection of the projector radiation occurs substantially at the reflection coating and not at the external pane surfaces, it is not necessary to arrange the external pane surfaces at an angle relative to one another in order to avoid ghost images. The external surfaces of the composite pane are, consequently, preferably arranged substantially parallel to one another. The thermoplastic intermediate layer is preferably not implemented wedge-like, but, instead, has a substantially constant thickness, in particular even in the vertical course between the upper edge and the lower edge of the composite pane, just like the inner pane and the outer pane. A wedge-like intermediate layer would, in contrast, have a variable thickness, in particular an increasing thickness, in the vertical course between the lower edge and the upper edge of the pane. The intermediate layer is typically formed from at least one thermoplastic film. Since standard films are significantly more economical than wedge films, the production of the composite pane is more economical.

The outer pane and the inner pane are preferably made of glass, in particular of soda lime glass, which is customary for window panes. In principle, however, the panes can also be made of other types of glass (for example, borosilicate glass, quartz glass, aluminosilicate glass) or transparent plastics (for example, polymethyl methacrylate or polycarbonate). The thickness of the outer pane and the inner pane can vary widely. Preferably used are panes with a thickness in the range from 0.8 mm to 5 mm, preferably from 1.4 mm to 2.5 mm, for example, those with the standard thicknesses of 1.6 mm or 2.1 mm.

The outer pane, the inner pane, and the thermoplastic intermediate layer can be clear and colorless, but also tinted or colored. The outer pane and the inner panes can, independently of one another, be non-toughened, partially toughened, or toughened. If at least one of the panes is to be toughened, this can be thermal or chemical toughening.

In an advantageous embodiment, the outer pane and the inner pane are made of clear glass, i.e., not tinted or colored. Thus, high light transmittance is achieved, which has a particularly advantageous effect on the functionality of the sensor. In the context of the invention, "a clear glass" means a glass that that has a total transmittance (light transmittance) of at least 85% at a thickness of 4 mm, preferably at least 90%. The intermediate layer is also preferably clear, i.e., not tinted or colored.

The windshield is preferably curved in one or a plurality of spatial directions, as is customary for motor vehicle panes, wherein typical radii of curvature are in the range from approx. 10 cm to approx. 40 m. The windshield can, however, also be flat, for example, when it is intended as a pane for buses, trains, or tractors.

The thermoplastic intermediate layer contains at least one thermoplastic polymer, preferably ethylene vinyl acetate (EVA), polyvinyl butyral (PVB), or polyurethane (PU) or mixtures or copolymers or derivatives thereof, particularly preferably PVB. The intermediate layer is typically formed from a thermoplastic film. In addition to the polymer on which it is based, the film can have further components common in the art, in particular plasticizers, UV-blockers, IR-blockers, or stabilizers. The thickness of the intermediate layer is preferably from 0.2 mm to 2 mm, particularly preferably from 0.3 mm to 1 mm.

The composite pane preferably has no further thin-layer coatings other than the reflection coating, in particular no such coatings that reduce the intensity of the projector radiation reflected from the reflection coating.

The composite pane can be produced by methods known per se. The outer pane and the inner pane are laminated together via the intermediate layer, for example, by autoclave methods, vacuum bag methods, vacuum ring methods, calender methods, vacuum laminators, or combinations thereof. The bonding of the outer pane and the inner pane is customarily done under the action of heat, vacuum, and/or pressure.

The reflection coating is preferably applied to a pane surface the respective pane surfaces by physical vapor deposition (PVD), particularly preferably by cathodic sputtering ("sputtering"), most particularly preferably by magnetron-enhanced cathodic sputtering ("magnetron sputtering"). The coating is preferably applied prior to lamination. Instead of applying the reflection coating to a pane surface, it can, in principle, also be provided on a carrier film arranged in the intermediate layer.

If the composite pane is to be bent, the outer pane and the inner pane are subjected to a bending process, preferably before lamination and preferably after any coating processes. Preferably, the outer pane and the inner pane are bent congruently together (i.e., at the same time and by the same tool), since, thus, the shape of the panes is optimally matched for the subsequently occurring lamination. Typical temperatures for glass bending processes are, for example, 500° C. to 700° C. This temperature treatment also increases the transparency and reduces the sheet resistance of the reflection coating.

The invention also includes a projection assembly for a head-up display (HUD). The projection assembly according to the invention comprises at least

- a composite pane according to the invention,
- a sensor attached to the interior-side surface of the inner pane, associated with the sensor region, i.e., directed at the sensor region, and
- a projector (HUD projector) that is directed at the HUD region and whose radiation is predominantly p-polarized.

As is usual with HUDs, the projector irradiates a region (the HUD region) of the composite pane, where the radiation is reflected in the direction of the viewer (driver), creating a virtual image that the viewer perceives, from his perspective, as behind the composite pane. The beam direction of the projector can typically be varied by mirrors, in particular vertically, in order to adapt the projection to the body size of the viewer. The region in which the eyes of the viewer must be situated with a given mirror position is referred to as the "eyebox window". This eyebox window can be shifted vertically by readjustment of the mirrors, with the entire region thus available (i.e., the superimposing of all possible eyebox windows) referred to as the "eyebox". A viewer situated within the eyebox can perceive the virtual image. This, of course, means that the eyes of the viewer must be situated within the eyebox, not the entire body.

The technical terms used here from the field of HUDs are generally known to the person skilled in the art. For a detailed presentation, reference is made to Alexander Neumann's dissertation "Simulation-Based Measurement Technology for Testing Head-Up Displays" at the Institute of Computer Science at the Technical University of Munich (Munich: University Library of the Technical University of Munich, 2012), in particular Chapter 2 "The Head-Up Display".

The projector is directed at the HUD region of the composite pane. It irradiates the HUD region with radiation in the visible range of the electromagnetic spectrum to generate the HUD projection, in particular in the spectral range from 450 nm to 650 nm, for example, with the wavelengths 473 nm, 550 nm, and 630 nm (RGB).

The projector radiation directed at the composite pane is primarily reflected at the reflection coating (i.e., the electrically conductive coating according to the invention), i.e., the highest intensity reflection occurs at the reflection coating. In other words, the intensity of the projector radiation reflected at the reflection coating is higher than the intensity of the radiation reflected at any other interface, in particular, higher than the intensities of the projector radiation reflected at the interior-side surface of the inner pane and the exterior-side surface of the outer pane.

The projector is arranged in the interior relative to the composite pane and irradiates the composite pane via the interior-side surface of the inner pane. According to the invention, the radiation of the projector is predominantly p-polarized, i.e., has a p-polarized radiation proportion greater than 50%. The higher the proportion of p-polarized radiation in the total radiation of the projector, the higher the intensity of the desired projection image and the lower the intensity of the unwanted reflections from the surfaces of the composite pane. The p-polarized radiation component of the projector is preferably at least 70%, particularly preferably at least 80%, and in particular at least 90%. In a particularly advantageous embodiment, the radiation of the projector is essentially purely p-polarized—the p-polarized radiation component is thus 100% or deviates only insignificantly therefrom. The indication of the polarization direction is based on the plane of incidence of the radiation on the composite pane. The expression "p-polarized radiation" refers to radiation whose electric field oscillates in the plane of incidence. "S-polarized radiation" refers to radiation whose electric field oscillates perpendicular to the plane of incidence. The plane of incidence is defined by the incidence vector and the surface normal of the composite pane in the geometric center of the irradiated region.

The polarization, i.e., in particular the proportion of p- and s-polarized radiation, is determined at one point of the HUD region, preferably in the geometric center of the HUD region. If the composite pane is curved, which is usually the case in particular with vehicle windows, this affects the plane of incidence of the projector radiation. Consequently, slightly deviating polarization proportions can occur in the remaining regions, which is unavoidable for physical reasons.

The radiation of the projector preferably strikes the composite pane with an angle of incidence from 45° to 70°, in particular from 60° to 70°. In an advantageous embodiment, the angle of incidence deviates from Brewster's angle by at most 10°. The p-polarized radiation is then reflected only insignificantly at the surfaces of the composite pane such that no ghost image is generated. The angle of incidence is the angle between the vector of incidence of the projector radiation and the interior-side surface normal (i.e., the surface normal on the interior-side external surface of the composite pane) in the geometric center of the HUD region. Brewster's angle for an air/glass transition in the case of soda lime glass, which is commonly used for window panes, is 56.5°. Ideally, the angle of incidence should be as close as possible to this Brewster's angle. However, angles of incidence of 65°, which are common for HUD projection assemblies, are easily implemented in vehicles, and deviate only slightly from Brewster's angle can, for example, also be used such that the reflection of the p-polarized radiation increases only insignificantly.

The invention also includes the use of a projection assembly according to the invention as an HUD in a vehicle, preferably a motor vehicle, in particular a passenger car or truck. The composite pane is preferably the windshield of the vehicle.

In the following, the invention is explained in detail with reference to drawings and exemplary embodiments. The drawings are schematic representations and are not true to scale. The drawings in no way restrict the invention.

Figure 2:
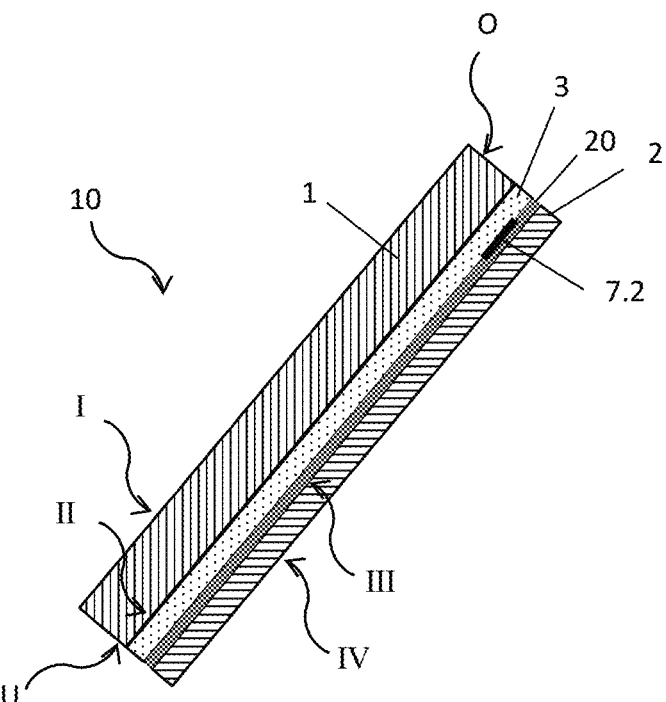
Figure 3:
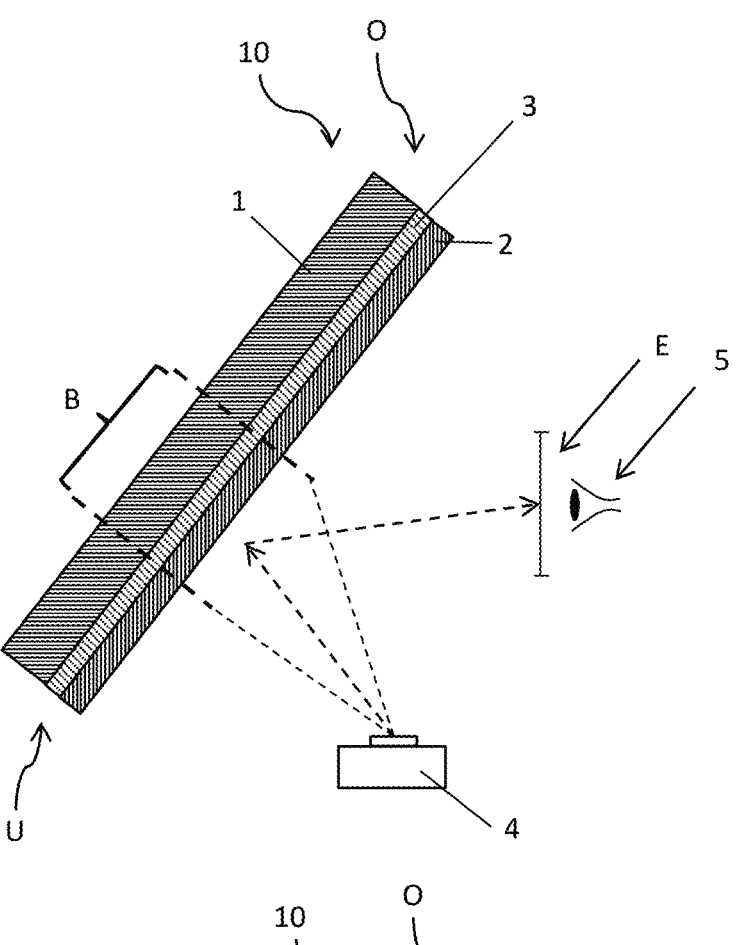
Figure 4:
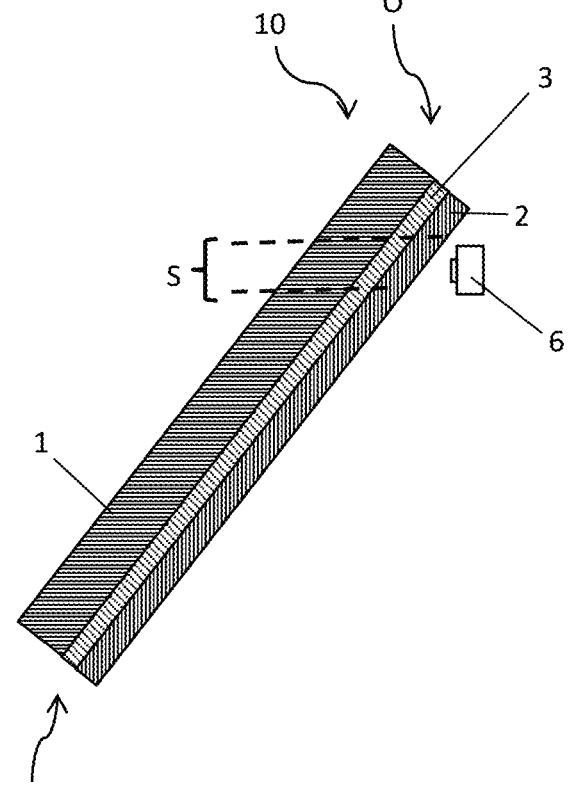
Figure 5:
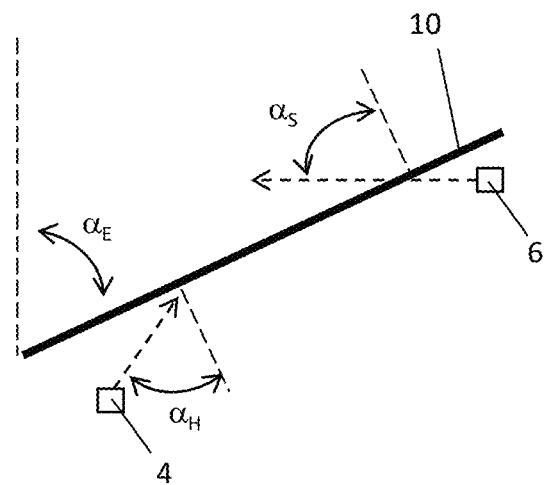
Figure 6:
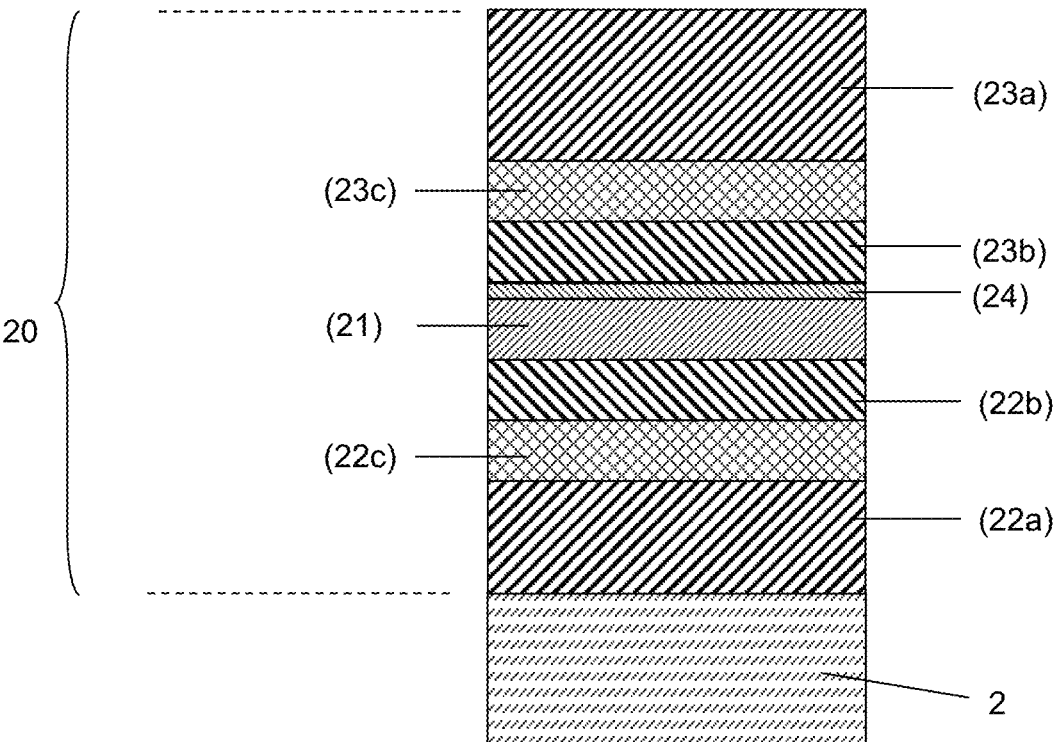
Figure 7:
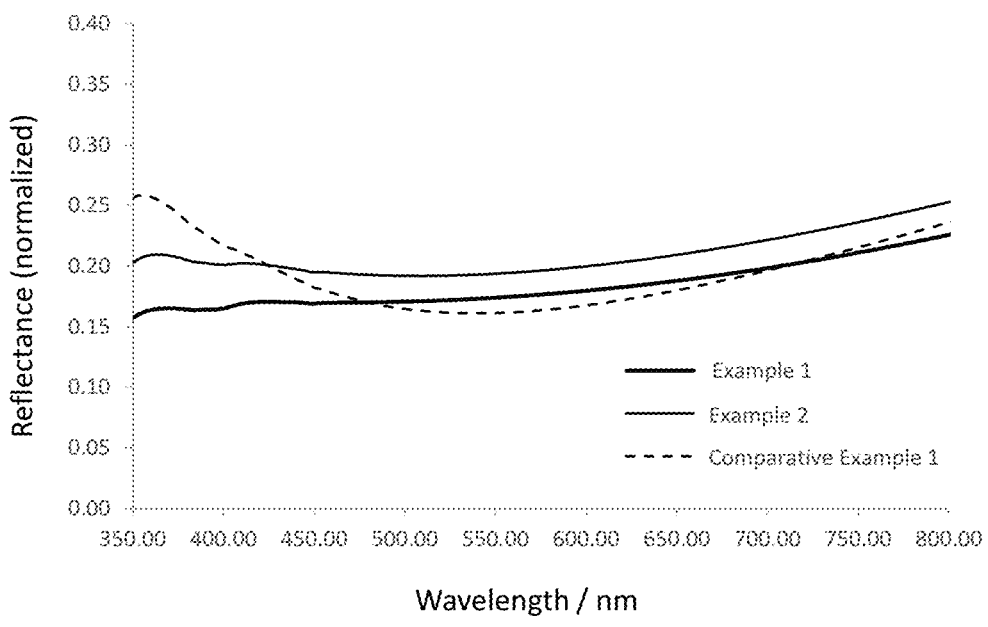
Figure 8:
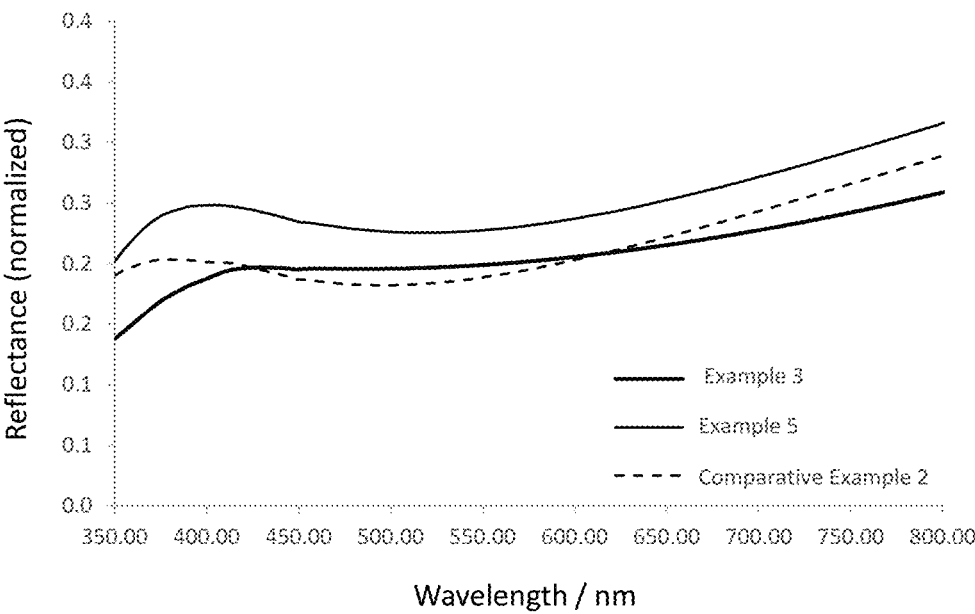
Figure 9:
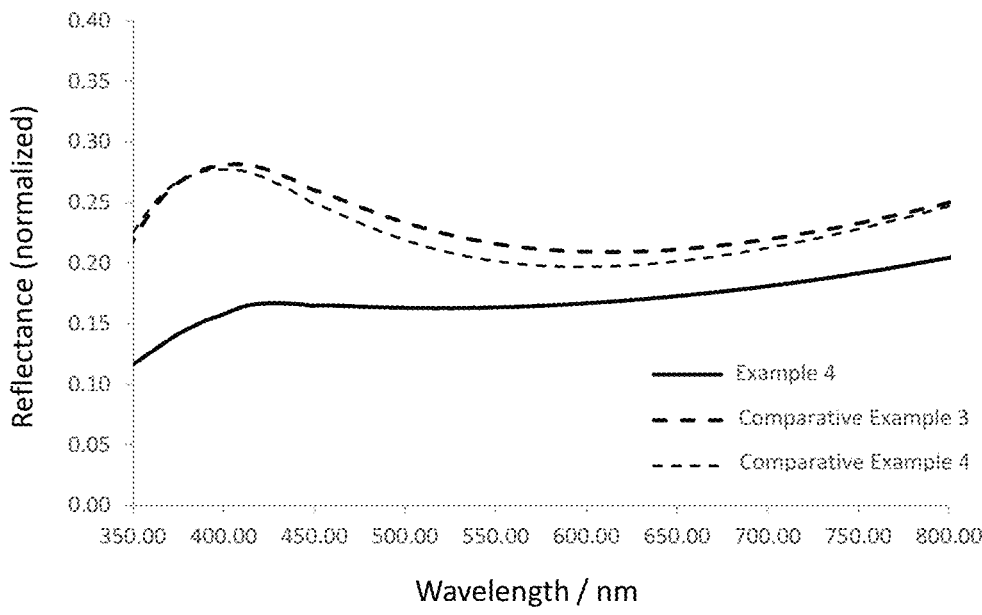

They depict:

FIG. 1 a plan view of a composite pane according to the invention,

FIG. 2 a cross-section through the composite pane of FIG. 1,

FIG. 3 a first cross-section through the composite pane of FIG. 1 as part of a projection assembly according to the invention, FIG. 4 a second cross-section through the composite pane of FIG. 1 as part of a projection assembly according to the invention, FIG. 5 a schematic side view of a projection assembly according to the invention, FIG. 6 a cross-section through an embodiment of the reflection coating according to the invention on an inner pane, FIG. 7 reflection spectra of composite panes for p-polarized radiation in accordance with Examples 1 and 2 and Comparative Example 1, FIG. 8 reflection spectra of composite panes for p-polarized radiation in accordance with Example 3 and Comparative Example 2, and FIG. 9 reflection spectra of composite panes for p-polarized radiation in accordance with Examples 4 and 5 and Comparative Examples 3 and 4.

Figure 10:
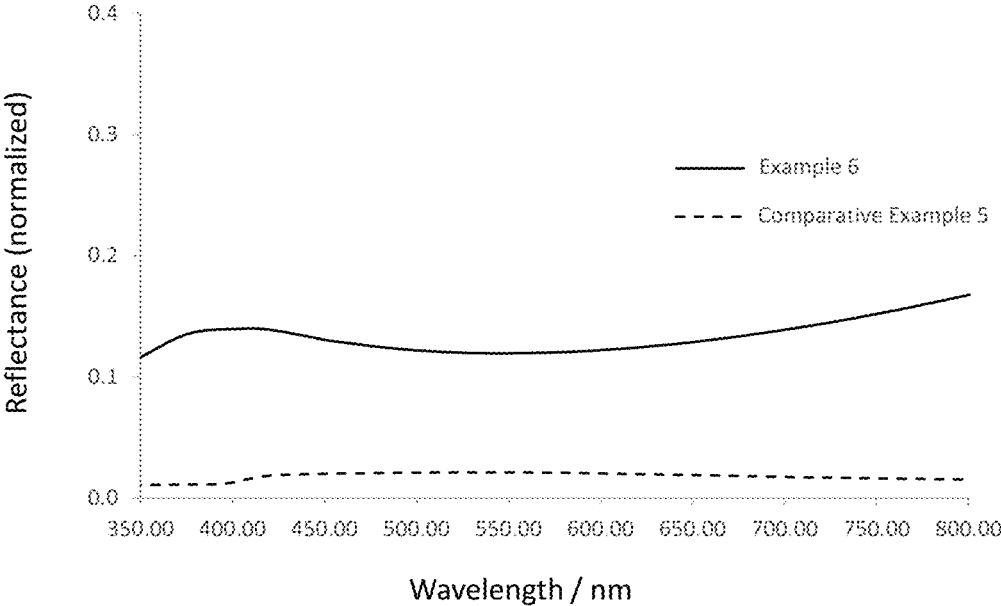
Figure 11:
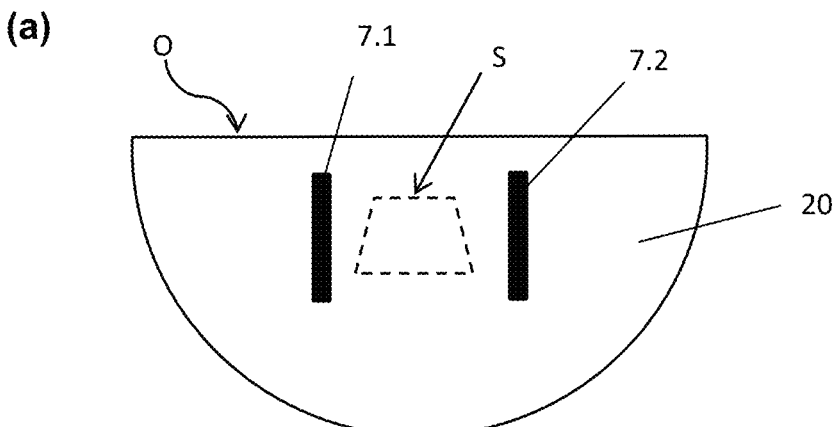
Figure 11:
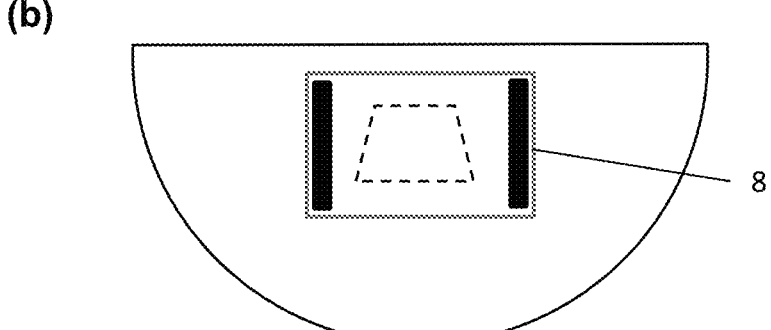
Figure 11:
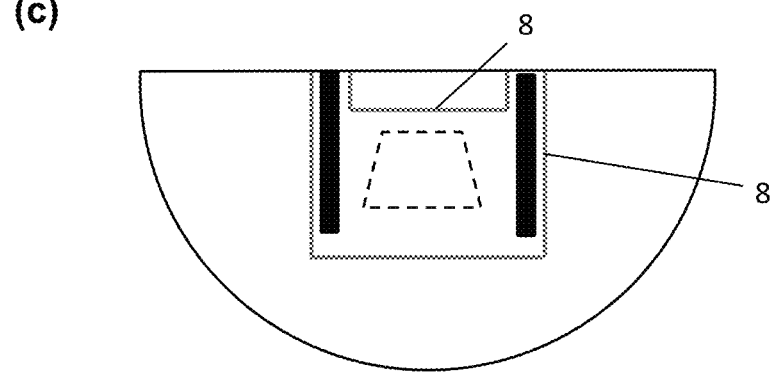
Figure 11:
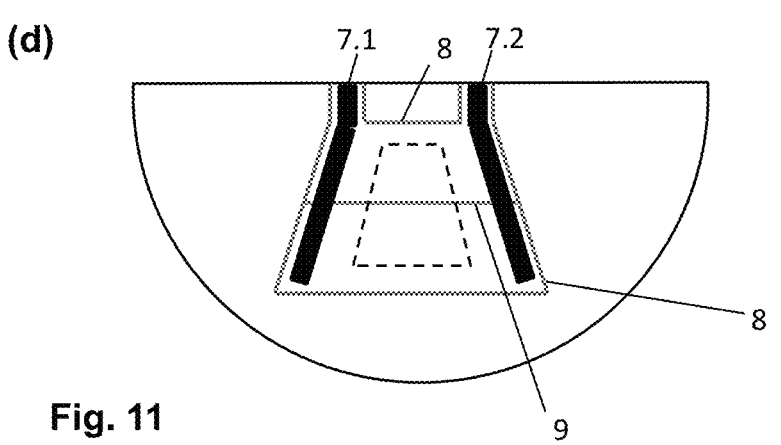

FIG. 10 reflection spectra of composite panes for p-polarized radiation in accordance with Example 6 and Comparative Example 5, FIG. 11 plan views of the heatable sensor region of four embodiments of the composite pane according to the invention.

FIG. 1 and FIG. 2 depict in each case a detail of a composite pane 10 according to the invention. The composite pane 10 is the windshield of a passenger car. The composite pane 10 is constructed from an outer pane 1 and an inner pane 2 that are joined to one another via a thermoplastic intermediate layer 3. Its lower edge U is arranged downward in the direction of the engine of the passenger car; its upper edge O, upward in the direction of the roof. Two side edges S1, S2 extend between the upper edge O and the lower edge U.

In the installed position, the outer pane 1 faces the external surroundings; the inner pane 2, the vehicle interior. The outer pane 1 has an exterior-side surface I that, in the installed position, faces the external surroundings, and an interior-side surface II that, in the installed position, faces the interior. Likewise, the inner pane 2 has an exterior-side surface III that, in the installed position, faces the external surroundings, and an interior-side surface IV that, in the installed position, faces the interior. The outer pane 1 and the inner pane 2 are made, for example, of clear soda lime glass. The outer pane has, for example, a thickness of 2.1 mm; the inner pane 2, a thickness of 1.6 mm or 2.1 mm. The intermediate layer 3 is made, for example, of a PVB film with a thickness of 0.76 mm. The PVB film has a substantially constant thickness, apart from any surface roughness common in the art—it is not implemented as a so-called "wedge film".

The composite pane 10 has an HUD region B, which is arranged at least partially in the central field of vision (field of vision B per ECE-R43) of the composite pane 10. The HUD region B is intended to be irradiated by an HUD projector to generate an HUD image, which is perceived by a viewer (vehicle driver) as virtual images on the side of the composite pane 10 facing away from him.

The composite pane 10 also has a sensor region S. The sensor region S is arranged outside the central field of vision (field of vision B per ECE-R43), namely between this central field of vision and the upper edge O. The composite pane 10 is intended to be equipped with a sensor that is arranged in the interior relative to the sensor region S and is associated therewith in such a way that electromagnetic radiation passing through the sensor region S can be detected by the sensor.

The exterior-side surface III of the inner pane 2 is provided with an electrically conductive coating 20 according to the invention. The electrically conductive coating 20 serves, on the one hand, as a reflection surface for the radiation of the HUD projector, which is p-polarized in order to avoid reflections on the external surfaces I, IV facing away from the intermediate layer. Consequently, the electrically conductive coating 20 can also be referred to as a reflection coating. The electrically conductive coating 20 is compatible with typical sensors for passenger cars such that it does not have to be removed in the sensor region S, but covers it as well. There, on the other hand, it is provided to heat the sensor region S. For this purpose, the electrically conductive coating 20 is electrically conductively connected on both sides of the sensor region S to two busbars 7.1, 7.2. The busbars 7.1, 7.2 are arranged laterally relative to the sensor region S, with the first busbar 7.1 arranged between the sensor region S and the first side edge S1 of the composite pane 10 and the second busbar 7.2 arranged between the sensor region S and the second side edge S2. The busbars 7.1, 7.2 are implemented, for example, in the form of a screen print that contains glass frits and silver particles and is printed on the electrically conductive coating 20. Alternatively, metallic foils, for example, tinned-copper foils can be used as busbars 7.1, 7.2, which are placed on the electrically conductive coating 20 and optionally soldered to it. The busbars 7.1, 7.2 are intended to be connected to a voltage source (in particular the on-board voltage of the passenger car) such that a current path for a heating current is formed, which runs across the sensor region S between the busbars 7.1, 7.2. For this, each of the busbars 7.1, 7.2 is contacted with a flat conductor (not shown) that extends beyond the upper edge O of the composite pane 10 and can be connected to cables for connection to the voltage source.

FIG. 3 and FIG. 4 depict in each case a cross-section through the composite pane 10 of FIGS. 1 and 2 as part of a projection assembly according to the invention. The cross-section of FIG. 3 extends through the HUD region B; the cross-section of FIG. 4, through the sensor region S. The electrically conductive coating 20 is not shown for the sake of simplicity.

The projection assembly comprises the composite pane 10 and an HUD projector 4 that is directed at the HUD region B of the composite pane 10 (FIG. 3). There, the radiation of the HUD projector 4 is reflected by the electrically conductive coating 20 such that an HUD image is generated, which is perceived by a viewer 5 (vehicle driver) as virtual images on the side of the composite pane 10 facing away from him, if his eyes are situated within the so-called "eyebox E". The radiation of the HUD projector 4 is p-polarized, in particular substantially purely p-polarized. Since the HUD projector 4 irradiates the composite pane 10 at an angle of incidence near Brewster's angle (not depicted realistically in the schematic drawing), the radiation of the projector 4 is only insignificantly reflected at the external surfaces I, IV of the composite pane 10. In contrast, the reflection coating 20 according to the invention is optimized for reflection of p-polarized radiation. It serves as a reflection surface for the radiation of the HUD projector 4 for generating the HUD projection.

Arranged in the interior relative to the sensor region S is a sensor 6 that can detect electromagnetic radiation (for example, light, IR-radiation, or radar radiation) passing through the sensor region S from outside (FIG. 4). The sensor 6 is, arranged for example, in a housing (not shown), which is attached, for example, is glued, to the interior-side surface IV of the inner pane 2. The sensor 6 is directed forward (relative to the direction of travel) substantially horizontally through the composite pane 10.

FIG. 5 illustrates some angles that occur in the projection assembly according to the invention. The composite pane 10 is a windshield that is installed in the vehicle with an installation angle de. The installation angle de is measured relative to the vertical and is, by way of example, 65°. The angle of incidence as with which radiation passing horizontally through the composite pane 10 from outside, which is then detected by the sensor 6, strikes the exterior-side surface I of the composite pane 10, is dependent on the installation angle $\alpha_E$. The angle of incidence $\alpha_S$ is the angle of the exterior-side surface normal of the exterior-side surface I of the outer pane 1 relative to the horizontal. Based on simple geometry, it follows that the angle of incidence $\alpha_S$ corresponds to the installation angle $\alpha_E$ (at least in the simplified case of a flat composite pane 10 that is shown). The radiation of the HUD projector 4 strikes the composite pane 10 at an angle of incidence $\alpha_H$, which is, by way of example, 65°. The angle of incidence is the angle between the projector radiation and the interior-side surface normal of the interior-side surface IV of the inner pane in the geometric center of the HUD region B.

In contrast to the simplified representation in the figure, real windshields are not flat, but curved. This results in location-dependency of the angles shown. The angle of incidence $\alpha_S$ used for the quantitative characterization is measured in the geometric center of the sensor region S; the angle of incidence $\alpha_H$ in the geometric center of the HUD region B.

FIG. 6 depicts the layer sequence of an embodiment of the electrically conductive coating 20 (reflection coating 20) according to the invention. The reflection coating 20 is a stack of thin layers. The reflection coating 20 includes an electrically conductive layer 21 based on silver. A metallic blocking layer 24 is arranged directly above the electrically conductive layer 21. Above that, an upper dielectric layer sequence is arranged, consisting, from bottom to top, of an upper matching layer 23b, an upper refractive-index-enhancing layer 23c, and an upper anti-reflection layer 23a. Arranged below the electrically conductive layer 21 is a lower dielectric layer sequence, consisting, from top to bottom, of a lower matching layer 22b, a lower refractive-index-enhancing layer 22c, and a lower anti-reflection layer 22a.

The layer structure shown is intended only as an example. The dielectric layer sequences can also include more or fewer layers, provided at least one dielectric layer is present above and below the conductive layer 21. The dielectric layer sequences also do not have to be symmetrical. Exemplary materials and layer thicknesses can be found in the following Examples.

The layer sequences of a composite pane 10 with the reflection coating 20 on the exterior-side surface III of the inner pane 2 in accordance with Examples 1 through 5 according to the invention, together with the materials and geometric layer thicknesses of the individual layers are presented in Table 1. Independent of one another, the dielectric layers can be doped, for example, with boron or aluminum.

TABLE 1

| Material | Reference Character | | Example 1 | Example 2 | Example 3 | Example 4 | Example 5 |
|---|---|---|---|---|---|---|---|
| | | | Layer Thickness | | | | |
| Soda lime glass | 1 | | 2.1 mm | 2.1 mm | 2.1 mm | 2.1 mm | 2.1 mm |
| PVB | 3 | | 0.76 mm | 0.76 mm | 0.76 mm | 0.76 mm | 0.76 mm |
| SiN | 20 | 23a | 70 nm | 70 nm | 60 nm | 60 nm | 50 nm |
| SiZrN | | 23c | — | — | — | 10 nm | — |
| ZnO | | 23b | — | — | 10 nm | 10 nm | 10 nm |
| NiCr | | 24 | 0.3 nm | 0.3 nm | 0.3 nm | 0.3 nm | 0.3 nm |
| Ag | | 21 | 11 nm | 12 nm | 12 nm | 11 nm | 14 nm |
| ZnO | | 22b | — | — | 10 nm | 10 nm | 10 nm |
| SiZrN | | 22c | — | — | — | 10 nm | — |
| SiN | | 22a | 30 nm | 35 nm | 25 nm | 20 nm | 25 nm |
| Soda lime glass | 2 | | 2.1 mm | 2.1 mm | 2.1 mm | 2.1 mm | 2.1 mm |

For comparison, Comparative Examples 1 through 4, which do not conform to the features according to the invention, were investigated. Their layer sequences are shown in Table 2.

TABLE 2

| Material | Reference Character | | Comparative Example 1 | Comparative Example 2 | Comparative Example 3 | Comparative Example 4 |
|---|---|---|---|---|---|---|
| | | | Layer Thickness | | | |
| Soda lime glass | 1 | | 2.1 mm | 2.1 mm | 2.1 mm | 2.1 mm |
| PVB | 3 | | 0.76 mm | 0.76 mm | 0.76 mm | 0.76 mm |
| SiN | 20 | 23a | 50 nm | 35 nm | 30 nm | 40 nm |
| SiZrN | | 23c | — | — | 10 nm | 10 nm |
| ZnO | | 23b | — | 10 nm | 10 nm | 10 nm |
| NiCr | | 24 | 0.3 nm | 0.3 nm | 0.3 nm | 0.3 nm |
| Ag | | 21 | 12 nm | 13 nm | 13 nm | 13 nm |
| ZnO | | 22b | — | 10 nm | 10 nm | 10 nm |
| SiZrN | | 22c | — | — | 10 nm | 10 nm |
| SiN | | 22a | 50 nm | 35 nm | 50 nm | 40 nm |
| Soda lime glass | 2 | | 2.1 mm | 2.1 mm | 2.1 mm | 2.1 mm |

The Examples and the Comparative Examples differ primarily in the ratio of the optical thickness of the upper dielectric layer sequence to the optical thickness of the lower dielectric layer sequence. The optical thickness is in each case the product of the geometric thickness and the refractive index (SiN: 2.0; SiZrN: 2.2, ZnO: 2.0) shown in Tables 1 and 2. The optical thicknesses and their ratio are summarized in Table 3. The ratio $\phi$ describes the ratio of the optical thickness of the upper dielectric layer 23a or layer sequence 23a, 23b, optionally 23c to the optical thickness of the lower dielectric layer 22a or layer sequence 22a, 22b, optionally 22c.

TABLE 3

| | Optical Thickness of the Upper Dielectric Layer Sequence | Optical Thickness of the Lower Dielectric Layer Sequence | Ratio $\phi$ |
|---|---|---|---|
| Example 1 | 140 | 60 | 2.33 |
| Example 2 | 140 | 70 | 2.00 |
| Example 3 | 140 | 70 | 2.00 |
| Example 4 | 162 | 82 | 1.98 |
| Example 5 | 120 | 70 | 1.71 |
| Example 6 | 130 | 72 | 1.8 |
| Comparative Example 1 | 100 | 100 | 1.00 |

TABLE 3-continued

| | Optical Thickness of the Upper Dielectric Layer Sequence | Optical Thickness of the Lower Dielectric Layer Sequence | Ratio $\phi$ |
|---|---|---|---|
| Comparative Example 2 | 90 | 90 | 1.00 |
| Comparative Example 3 | 102 | 142 | 0.72 |
| Comparative Example 4 | 122 | 122 | 1.00 |

FIG. 7, FIG. 8, and FIG. 9 depict reflection spectra of composite panes 10 as in FIG. 2, in each case with a layer structure in accordance with Examples 1 through 5 according to the invention of Table 1 and in accordance with Comparative Examples 1 through 4 of Table 2. The reflection spectra were recorded with a light source that emits p-polarized radiation of uniform intensity in the spectral range observed, when irradiated via the inner pane 2 (so-called interior-side reflection) at an angle of incidence of 65° relative to the interior-side surface normal. The reflection measurement is thus approximated to the situation in the projection assembly. For better clarity, the Examples and Comparative Examples that have a similar layer structure are summarized in each case. In FIG. 7, Examples 1 and 2 and Comparative Example 1 are shown, having, in each case, only dielectric anti-reflection layers 22*a*, 23*a*. FIG. 8 shows Examples 3 and 5 and Comparative Example 2, having in each case dielectric anti-reflection layers 22*a*, 23*a*, and matching layeren 22*b*, 23*b*. FIG. 9 shows Example 4 and Comparative Examples 3 and 4, having in each case dielectric anti-reflection layers 22*a*, 23*a*, matching layers 22*b*, 23*b*, and refractive-index-enhancing layers 22*c*, 23*c*.

From the graphic representation of the spectra, it is already apparent that the Examples according to the invention with the ratio according to the invention of the optical thicknesses of the upper and lower dielectric layer or layer sequence result in a substantially smoother spectrum in the spectral range of interest from 400 nm to 680 nm. This ensures a more color-neutral display of the HUD projection. In addition, the general color impression of the pane is improved.

The averaged reflectance for p-polarized radiation as well as the differences of the maximum and minimum values relative to the reflectance of Examples 1 through 5 are summarized in Table 4; the corresponding values for the Comparative Examples 1 through 4, in Table 5. Also, the standard deviation of the reflection spectrum is indicated in each case. The analyses refer in each case to the spectral range from 400 nm to 680 nm.

of the optical thicknesses of the lower and upper dielectric layer/layer sequence of the examples according to the invention results in a significant smoothing of the reflection spectrum, which leads to a more color-neutral reproduction of the projector image and a more color-neutral overall impression.

Table 6 shows the layer sequence of a composite pane 10 with the reflection coating 20 on the exterior-side surface III of the inner pane 2 according to another Example 6 according to the invention, together with the materials and geometric layer thicknesses of the individual layers. The dielectric layers can, independently of one another, be doped, for example, with boron or aluminum.

TABLE 6

| Material | Reference Character | Layer Thickness Example 6 |
|---|---|---|
| Soda lime glass | 1 | 2.1 mm |
| PVB | 3 | 0.76 mm |
| SiN | 20  23a | 55 nm |
| SiZrN | 23c | — |
| ZnO | 23b | 10 nm |
| NiCr | 24 | 0.3 nm |
| Ag | 21 | 10 nm |

TABLE 4

| | Example 1 | Example 2 | Example 3 | Example 4 | Example 5 | Example 6 |
|---|---|---|---|---|---|---|
| Averaged reflectance for p-polarized radiation, 400 nm-680 nm | 17.6% | 19.9% | 20.2% | 16.6% | 23.8% | 12.7% |
| difference between the maximally occurring reflectance and the mean | 1.8% | 1.7% | 2.0% | 1.1% | 2.6% | 1.4% |
| difference between the minimally occurring reflectance and the mean | 1.1% | 0.7% | 1.5% | 0.9% | 1.2% | 0.7% |
| Standard deviation, 400 nm-680 nm | 0.55% | 0.48% | 0.60% | 0.27% | 1.08% | 0.65% |

TABLE 5

| | Comp. Example 1 | Comp. Example 2 | Comp. Example 3 | Comp. Example 4 | Comp. Example 5 |
|---|---|---|---|---|---|
| Averaged reflectance for p-polarized radiation, 400 nm-680 nm | 17.6% | 19.8% | 23.1% | 22.0% | 2.0% |
| difference between the maximally occurring reflectance and the mean | 4.2% | 3.6% | 5.1% | 5.8% | 0.1% |
| difference between the minimally occurring reflectance and the mean | 1.4% | 1.6% | 2.2% | 2.3% | 0.7% |
| Standard deviation. 400 nm-680 nm | 1.49% | 1.11% | 2.52% | 2.70% | 0.16% |

TABLE 6-continued

| Material | Reference Character | Layer Thickness Example 6 |
|---|---|---|
| ZnO | 22b | 10 nm |
| SiZrN | 22c | 10 nm |
| SiN | 22a | 15 nm |
| Soda lime glass | 2 | 1.6 mm |

The outer pane 1 and the inner pane 2 of Example 6 were again made of clear soda lime glass. Comparative Example 5 was investigated for comparison. Comparative Example 5 had no electrically conductive coating 20; the thicknesses of the outer pane 1 and of the inner pane 2 corresponded to those of Example 6. In contrast, the outer pane 1 was made of green-colored soda lime glass, while the inner pane 2 was made of clear soda lime glass.

Table 7 compares transmittance values at different radiation angles (relative to the exterior-side surface normals) of Examples and Comparative Examples with one another. The transmittance values were measured with illuminant A, the angle listed indicates the angle of incidence.

Although relatively high average reflection values can also be achieved in the Comparative Examples, the spectra in the relevant spectral range from 400 nm to 680 nm are subject to strong fluctuations, which can lead to undesirable color shifts in the HUD image and to a poorer color impression of the pane for the viewer. In contrast, the ratio All panes have light transmittance greater than 70% at an angle of incidence of 0° such that they can be used as a windshield.

The comparison of Examples 1 through 6 further shows that the thinner the silver layer, the higher the light transmittance at angles of incidence greater than 0°. This is advantageous in terms of the functionality of the sensor.

At an angle of incidence of 0° (the light strikes the composite pane 10 perpendicularly), the transmittance of Example 6 and of Comparative Example 5 is comparable. However, as the angle of incidence increases, the transmittance of Example 6 is significantly higher. Since the radiation detected by the sensor 6 passes through the composite pane 10 at an angle that is typically in the range of the specified values, the detection efficiency of Example 6 is significantly higher.

The polarization ratio, defined as the ratio of the transmittance of p-polarized radiation TL(p-pol) to the transmittance of s-polarized radiation TL(s-pol), measured here at an angle of incidence of 70°, is also compared. It can be seen that the Examples according to the invention tend to have a significantly higher polarization ratio than the Comparative Examples, such that s-polarized reflections, for example, from a wet road, have a less interfering effect on the sensor 6. In particular, when comparing Example 6 to Comparative Examples 1 and 5, which have essentially the same light transmittance (0°), the advantageous influence of the layer structure according to the invention on the polarization ratio can be seen.

TABLE 7

| | TL A (0°) | TL A (60°) | TL A (70°) | TL A (73.5°) | $\frac{TL\ (p-pol)}{TL\ (s-pol)}(70°)$ |
|---|---|---|---|---|---|
| Example 1 | 73.5% | 68.1% | 59.2% | 53.7% | 1.68 |
| Example 2 | 72.6% | 67.2% | 58.3% | 52.9% | 1.64 |
| Example 3 | 71.9% | 66.7% | 58.0% | 52.6% | 1.64 |
| Example 4 | 73.9% | 68.7% | 59.7% | 54.1% | 1.66 |
| Example 5 | 71.2% | 65.0% | 56.2% | 51.0% | 1.56 |
| Example 6 | 80.0% | 73.4% | 63.1% | 56.9% | 1.67 |
| Comparative Example 1 | 80.1% | 72.6% | 62.0% | 55.8% | 1.58 |
| Comparative Example 2 | 78.5% | 70.3% | 60.0% | 54.1% | 1.56 |
| Comparative Example 3 | 73.2% | 68.3% | 59.0% | 53.4% | 1.56 |
| Comparative Example 4 | 74.2% | 69.4% | 59.8% | 54.1% | 1.54 |
| Comparative Example 5 | 80.1% | 71.3% | 60.4% | 53.9% | 1.49 |

FIG. 10 shows reflectance spectra of Example 6 per Table 6 and Comparative Example 5. The reflectance spectra were recorded under the same conditions as the reflectance spectra of FIG. 7 through 9. Since Comparative Example 5 had no reflection coating 20, no satisfactory reflectance for p-polarized radiation occurs, as expected. In contrast, good values are obtained with Example 6. The quantitative analyses of the reflectance spectra are indicated In Tables 4 and 5; the optical thicknesses of Example 6, in Table 3.

FIG. 11 depicts various embodiments of the heatable sensor region S of the composite pane according to the invention. In the embodiment of FIG. 11a, the busbars 7.1, 7.2 are connected to the region of the coating 20 that is to be heated and contains the sensor region S, without said region being isolated from the surrounding coating. When a voltage is applied to the busbars 7.1, 7.2, a heating current flows through the region of the coating 20 between them such that the sensor window S is heated.

In the embodiment of FIG. 11b, a region of the coating 20 that contains the sensor region S is materially separated from the surrounding regions of the coating 20 by an insulation line 8 and is, consequently, electrically insulated. The insulation line 8 is implemented as a circumferential line that encloses, for example, a rectangular shape. The region (heating region) delimited by the insulation line 8 is completely surrounded by other regions of the coating 20. The busbars 7.1, 7.2 are arranged completely within the heating region. As a result of the insulation lines 8, the heating current is limited to the region intended for heating; "outward radiation" of the heating current can be prevented. The insulation line 8 is, for example, produced by laser decoating.

FIG. 11c shows another embodiment of the separation of the heating region by insulation lines 8. A region of the coating 20 that contains the busbars 7.1, 7.2 and the sensor window S is isolated from the surrounding regions of the coating 20 by a first ("outer") insulation line 8. The beginning and the end of this first insulation line 8 are located at the edge of the coating 20. This separated, for example, rectangular, region is adjacent said edge of the coating 20, which coincides, in the representation, with the upper edge O of the composite pane; whereas, in reality, there is often an uncoated edge region such that the insulation line 8 does not extend all the way to the upper edge O but only up to this edge of the coating 20 facing it. This embodiment has the advantage that the busbars 7.1, 7.2 can extend all the way to or close to to the upper edge O of the composite pane, which is advantageous in terms of their electrical connection. Between the busbars, a further region of the coating 20 adjacent the edge is excluded from the heating region by a second ("inner") insulation line 8. The beginning and the end of this second insulation line 8 are located at the edge of the coating 20. Starting from the edge of the coating 20, the two insulation lines have in each case two end sections that extend parallel to the busbars 7.1, 7.2 and a middle section therebetween that runs substantially parallel to the current path. The actual heating region is then delimited on the one hand by the busbars 7.1, 7.2; on the other, by the middle sections of the insulation lines 8.

The separation of the heating region from the surrounding coating 20 is realized in FIG. 11d in a manner similar to that in FIG. 11c with two insulation lines 8. A further insulation line 9 runs through the heating region substantially parallel to the desired current direction. The flow of current can be selectively directed by the insulation line 9. This is, in particular, advantageous when the busbars 7.1, 7.2, as in the case shown, do not run parallel to one another, such that the distance between them and, consequently, the electrical resistance between them is not constant. By directing a current path using the insulation line 9, it can be ensured that the entire sensor region S is heated as uniformly as possible. Instead of just one, there can be multiple insulation lines 9.

LIST OF REFERENCE CHARACTERS (10) composite pane
(1) outer pane
(2) inner pane
(3) thermoplastic intermediate layer
(4) projector
(5) viewer/vehicle driver
(6) sensor
(7.1) first busbar
(7.2) second busbar

(8) insulation line for delimiting the heated coating 20 in the sensor region S from the surrounding coating 20

(9) insulation line for guiding the current path within the sensor region S

(20) electrically conductive coating/reflection coating

(21) electrically conductive layer

(22a) first lower dielectric layer/anti-reflection layer

(22b) second lower dielectric layer/matching layer

(22c) third lower dielectric layer/refractive-index-enhancing layer

(23a) first upper dielectric layer/anti-reflection layer

(23b) second upper dielectric layer/matching layer

(23c) third upper dielectric layer/refractive-index-enhancing layer

(24) metallic blocking layer

(O) upper edge of the composite pane 10

(U) lower edge of the composite pane 10

(S1) first side edge of the composite pane 10

(S2) second side edge of the composite pane 10

(B) HUD region of the composite pane 10

(E) eyebox

(S) sensor region of the composite pane 10

(I) exterior-side surface of the outer pane 1

(II) interior-side surface of the outer pane 1

(III) exterior-side surface of the inner pane 2

(IV) interior-side surface of the inner pane 2

($\alpha_E$) installation angle of the composite pane 10 relative to vertical

($\alpha_S$) angle of incidence of the radiation detected by the sensor 6

($\alpha_H$) angle of incidence of the HUD projector 4

The invention claimed is:

1. A composite pane for a head-up display (HUD) with a heatable sensor region, comprising:

an outer pane with an exterior-side surface and an interior-side surface, an inner pane with an exterior-side surface and an interior-side surface, wherein the interior-side surface of the outer pane is joined to the exterior-side surface of the inner pane via a thermoplastic intermediate layer, an electrically conductive coating on the interior-side surface of the outer pane, on the exterior-side surface of the inner pane, or within the intermediate layer, wherein the composite pane has an HUD region that is provided for irradiation by an HUD projector with p-polarized radiation, and has a sensor region that is provided for transmission of electromagnetic radiation for a sensor directed toward the interior-side surface of the inner pane, and wherein the electrically conductive coating is adapted to reflect the radiation of the HUD projector, the electrically conductive coating has precisely one electrically conductive layer based on silver, a lower dielectric layer or lower dielectric layer sequence, whose refractive index is at least 1.9, is arranged below the electrically conductive layer, an upper dielectric layer or upper dielectric layer sequence, whose refractive index is at least 1.9, is arranged above the electrically conductive layer, a ratio of an optical thickness of the upper dielectric layer or upper dielectric layer sequence to an optical thickness of the lower dielectric layer or lower dielectric layer sequence is at least 1.7, the electrically conductive coating is present within the sensor region so as to completely cover the sensor region, and wherein a busbar provided for connection to a voltage source is arranged in each case on both sides of the sensor region and is connected to the electrically conductive coating such that a current path for a heating current is formed between the busbars, with said current path running across the sensor region.

2. The composite pane according to claim 1, that has light transmittance of at least 70% at an angle of incidence of 0° and light transmittance of at least 50% at an angle of incidence of 73.5°.

3. The composite pane according to claim 1, wherein a ratio of a transmittance of p-polarized light to a transmittance of s-polarized light at an angle of incidence of 70° is at least 1.20.

4. The composite pane according to claim 1, which has, in a spectral range from 400 nm to 680 nm, an averaged reflectance for p-polarized radiation of at least 10%, wherein a difference between a maximally occurring reflectance and a mean value of the reflectance as well as a difference between a minimally occurring reflectance and the mean value of the reflectance for p-polarized radiation is at most 3%.

5. The composite pane according to claim 1, which has an upper edge, a lower edge, and two side edges extending therebetween, wherein one busbar is arranged between the sensor region and one side edge of the two side edges and the other busbar is arranged between the sensor region and the other side edge of the two side edges.

6. The composite pane according to claim 1, wherein a heated region of the electrically conductive coating arranged between the busbars has an area of 20 cm$^2$ to 100 cm$^2$, while a majority of the composite pane is not heated by the electrically conductive coating.

7. The composite pane according to claim 1, wherein a region of the electrically conductive coating that contains the busbars and the sensor region situated therebetween is electrically isolated from the surrounding electrically conductive coating by an insulation line.

8. The composite pane according to claim 1, wherein the electrically conductive layer has a geometric thickness of 8 nm to 14 nm.

9. The composite pane according to claim 8, wherein the electrically conductive layer has a geometric thickness of 10 nm to 12 nm.

10. The composite pane according to claim 8, wherein the electrically conductive layer has a geometric thickness of 10 nm to 11 nm.

11. The composite pane according to claim 1, wherein
the optical thickness of the upper dielectric layer or upper dielectric layer sequence is from 100 nm to 200 nm, and
the optical thickness of the lower dielectric layer or lower dielectric layer sequence is from 50 nm to 100 nm.

12. The composite pane according to claim 11, wherein
the optical thickness of the upper dielectric layer or upper dielectric layer sequence is from 130 nm to 170 nm, and
the optical thickness of the lower dielectric layer or lower dielectric layer sequence is from 60 nm to 90 nm.

13. The composite pane according to claim 1, wherein the upper dielectric layer or upper dielectric layer sequence and the lower dielectric layer or lower dielectric layer sequence, independently of one another, have, in each case:
an anti-reflection layer based on silicon nitride,
optionally, a matching layer based on zinc oxide, and
optionally, a refractive-index-enhancing layer based on a mixed silicon-metal nitride.

14. The composite pane according to claim 1, wherein the outer pane and the inner pane are made of clear soda lime glass.

15. The composite pane according to claim 1, which is a vehicle windshield, wherein the sensor region is arranged outside and the HUD region is arranged at least partially within the field of vision B or I according to ECE-R43, wherein the field of vision B or I is not heated by the electrically conductive coating.

16. A projection assembly for a head-up display (HUD), comprising:

a composite pane according to claim 1, a sensor attached to the interior-side surface of the inner pane and directed toward the sensor region, and an HUD projector, which is directed toward the HUD region and whose radiation is p-polarized.

17. The projection assembly according to claim 16, wherein the sensor is an IR sensor, a light sensor, a UV sensor, a camera, a radar system, or a lidar system.

18. The projection assembly according to claim 16, wherein the radiation of the projector strikes the windshield at an angle of incidence of 60° to 70°.

\* \* \* \* \*